(12) United States Patent
D'Souza et al.

(10) Patent No.: US 9,148,419 B2
(45) Date of Patent: *Sep. 29, 2015

(54) USER ADMINISTERING A TRUSTWORTHY WORKSPACE

(71) Applicant: PivotCloud, Inc., Sunnyvale, CA (US)

(72) Inventors: Roy Peter D'Souza, Belleview, WA (US); Santosh S. Shanbhag, Saratoga, CA (US); Jieming Zhu, Saratoga, CA (US); Frank Salzmann, Danville, CA (US); Bala Kaushik, Cupertino, CA (US); Ronald Totah, Los Altos, CA (US); James Chappell, Los Gatos, CA (US)

(73) Assignee: PivotCloud, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/513,569

(22) Filed: Oct. 14, 2014

(65) Prior Publication Data

US 2015/0046985 A1 Feb. 12, 2015

Related U.S. Application Data

(63) Continuation-in-part of application No. 13/795,164, filed on Mar. 12, 2013, now Pat. No. 8,875,234, which is a continuation-in-part of application No. 13/716,351, filed on Dec. 17, 2012, now Pat. No.

(Continued)

(51) Int. Cl.
*H04L 9/32* (2006.01)
*H04L 29/06* (2006.01)
(Continued)

(52) U.S. Cl.
CPC .............. *H04L 63/08* (2013.01); *H04L 9/0825*
(2013.01); *H04L 9/0833* (2013.01); *H04L 9/14* (2013.01); *H04L 2209/76* (2013.01)

(58) Field of Classification Search
CPC ......... H04L 63/08; H04L 63/10; H04L 63/20;
H04L 63/101; H04L 63/107; H04L 63/102;
H04L 63/104; H04L 63/105; H04L 9/0833;
H04L 9/0825; H04L 9/14; H04L 63/00;
G06F 21/31; G06F 21/10; G06F 21/30
USPC ...................... 726/1–7, 26–30; 713/150, 163, 713/166–170, 189, 193
See application file for complete search history.

(56) References Cited

U.S. PATENT DOCUMENTS 8,214,747 B1* 7/2012 Yankovich et al. ............ 715/751
8,528,099 B2* 9/2013 Venkata Naga Ravi ........ 726/26
(Continued)

OTHER PUBLICATIONS

Van Dijk, Juels: On the Impossibility of Cryptoraphy Alone for Privacy-Preserving Cloud Computation Usenix Hotsec10 2010.
(Continued)

*Primary Examiner* — Hosuk Song
(74) *Attorney, Agent, or Firm* — Brian R. Short

(57) ABSTRACT

Methods, systems and apparatuses for an operator provisioning a trustworthy workspace to a subscriber are disclosed. One method includes providing the subscriber with the trustworthy workspace, where in the trustworthy workspace comprises a virtualized content repository with trustworthy workflows for storing, sharing and processing a digital content across a plurality of repositories. The method further includes allowing the subscriber authority to sub-provision the trustworthy workspace to one or more authorized parties, wherein only the one or more authorized parties can view or modify at least a portion of the digital content.

20 Claims, 23 Drawing Sheets

Related U.S. Application Data 8,681,992, which is a continuation-in-part of application No. 13/613,080, filed on Sep. 13, 2012, now abandoned.

(60) Provisional application No. 61/598,071, filed on Feb. 13, 2012.

(51) Int. Cl.
*H04L 9/08* (2006.01)
*H04L 9/14* (2006.01)

(56) References Cited

U.S. PATENT DOCUMENTS

| | | | |
|---|---|---|---|
| 8,696,765 B2 * | 4/2014 | Mendez et al. | 726/35 |
| 8,763,140 B2 * | 6/2014 | Marcus et al. | 726/26 |
| 8,975,234 B2 * | 3/2015 | Chen et al. | 514/25 |
| 2011/0119481 A1 | 5/2011 | Auradkar et al. | |
| 2011/0145580 A1 | 6/2011 | Auradkar et al. | |
| 2011/0145593 A1 | 6/2011 | Auradkar et al. | |
| 2012/0096389 A1 | 4/2012 | Flam et al. | |
| 2012/0221421 A1 | 8/2012 | Hammad | |
| 2012/0278388 A1 | 11/2012 | Chiu | |
| 2012/0321086 A1 | 12/2012 | D'souza et al. | |
| 2012/0323750 A1 | 12/2012 | Sivaramakrishnan et al. | |
| 2012/0324237 A1 | 12/2012 | D'souza et al. | |

OTHER PUBLICATIONS

D'Souzo, Jao, Mironov, Pandey. Publicly Verifiable Secret Sharing for Cloud-Based Key Management. Indocrypt 2011.
Boneh, Segev, Waters: Targeted malleability: homomorphic encryption for restricted computations. ACM 2012.
Dara: Cryptography Challenges for or Computation in Public Clouds. IACR Eprint 2013.
Chen: CloudHKA: A Cryptographic Approach for Hierarchical Access Control in Cloud Computing. ANCS'13 2013.
Junru Hu, Xu An Wang, Minquing Zhang, "Toward constant size CCA—secure multi-hop proxy re-encryption," Jul. 5-10, 2010, IEEE Signal Processing Systems (ICSPS), 2010 2nd International Conference, vol. 1 no., pp. V1-603, V1-605.
Liberty, B.; Vergnaud, D., "Undirectional Chosen-Ciphertext Secure Proxy Re-Encryption", Mar. 2011, Information Theory, IEEE Transactions, vol. 57, No. 3, pp. 1786, 1802.

* cited by examiner

Providing, by one or more operator servers, the subscriber with the trustworthy workspace, where in the trustworthy workspace comprises a virtualized content repository with trustworthy workflows for storing, sharing and processing a digital content across a plurality of repositories

512

Allowing, by the one or more operator servers, the subscriber authority to sub-provision the trustworthy workspace to one or more authorized parties, wherein only the one or more authorized parties can view or modify at least a portion of the digital content.

522

Facilitating the subscriber in vetting one or more other parties before allowing the one or more other parties to access the trustworthy workspace, based on information of the one or more other parties, wherein the one or more other parties become authorized parties if vetted more than a threshold, wherein the information of the one or more other parties comprises at least identities of the one or more other parties, and wherein the information further includes at least one of reputations, associations of the one or more other parties

One or more curators generating a first public key ($PK_{C1}$) and a second public key ($PK_{C2}$)
1110

The one or more curators publishing the first public key ($PK_{C1}$) and the second public key ($PK_{C2}$)
1120

The one or more curators generating a first proxy re-encryption key ($RK_{C1-C2}$) and a second proxy re-encryption key ($RK_{C2-B}$)
1130

The first party A encrypting data having a key k, wherein k is encrypted according to the first public key ($PK_{C1}$)
1140

One or more custodians proxy re-encrypting k from the first public key ($PK_{C1}$) to the second public key ($PK_{C2}$) using the first proxy re-encryption key ($RK_{C1-C2}$), wherein the proxy re-encryption is one-way
1150

The one or more custodians proxy re-encrypting k from the second public key ($PK_{C2}$) to a public key ($PK_B$) of the second party B using the second proxy re-encryption key ($RK_{C2-B}$), wherein the proxy re-encryption is one-way
1160

The second party B receiving the encrypted data and the encrypted k (now encrypted to $PK_B$) and obtaining the block cipher key k using a secret key $SK_B$, then subsequently decrypting data d
1170

Figure 11

A user publishing an electronic content for the group, comprising the user encrypting the electronic content to the group public key $PK_G$, wherein the electronic content includes a header and a payload
1940

Obtaining, by the member, the encrypted electronic content
1950

Requesting, by the member, mediation by the mediator, comprising the member dispatching the header of the encrypted electronic content to the mediator
1960

Determining, by the mediator, whether the member is eligible to decrypt the electronic content, if eligible, the mediator responding to the request for mediation with a member accessible header, wherein the member accessible header includes the header after application of $SK_{G2}$
1970

Obtaining, by the member, a secret based on $SK_{G1}$ and the member accessible header
1980

Decrypting, by the member, the payload of the electronic content using the secret

USER ADMINISTERING A TRUSTWORTHY WORKSPACE

RELATED APPLICATIONS

This application is a continuation-in-part (CIP) of U.S. patent application Ser. No. 13/795,164, filed Mar. 12, 2013, and entitled "Operator Provisioning of a Trustworthy Workspace to a Subscriber" which is a continuation-in-part (CIP) of U.S. patent application Ser. No. 13/716,351, filed Dec. 17, 2012, and entitled "Monitoring and Controlling Access to Electronic Content" which is a continuation-in-part (CIP) of U.S. patent application Ser. No. 13/613,080, filed Sep. 13, 2012, and entitled "Providing Trustworthy Workflow Across Trust Boundaries" which claims priority to U.S. Provisional Patent Application No. 61/598,071, filed Feb. 13, 2012, and entitled "High-Scale and Distributed Business and Consumer Networks," all of which are incorporated herein by reference.

FIELD OF THE DESCRIBED EMBODIMENTS

The described embodiments relate generally to electronic communication through cloud networks. More particularly, the described embodiments relate to methods, systems and apparatuses for a user administrating a trustworthy workspace.

BACKGROUND

Documents are the new digital currency for online commerce, the record of business for online collaboration, and the "lifeblood" of present day business processes. The documents include commercial artifacts such as catalogs, offers, bids and contracts. Doctors and Bioscientists leverage documents with domain-specific formats, such as HL7, and medical images. Business networks leverage design extranets through other specialized document types. Aerial surveillance and prospecting requires the sharing and storage of images. In the Pharmaceutical vertical, these documents might contain information about DNA sequencing, reagent information, and components of drug discovery.

The information contained in these documents is usually sensitive business IP, or Personally Identifiable Information (PII), and often content that is highly regulated by perhaps Health and Human Services (HIPAA, FDA), the Office of Currency Comptroller (Gramm-Leach-Bliley), or self-regulated through consortiums such as the PCI Council. As collaboration becomes global, accelerated through cloud-enabled geo-distribution, it is increasingly convenient for producers and consumers, buyers and sellers, business collaborators and others to leverage cloud-based services to effectively share documents through workflows to transact business. This requires the management of the lifecycles of these documents across trust boundaries that might include organizational, legal or international boundaries. Emerging cloud solutions have a propensity for reducing costs and optimizing ease of use, but if these solutions do not provide sufficient visibility into, and control over these regulated assets from inappropriate access or modification by cloud intermediaries, there could be significant business and other risks to organizations and their officers.

Efficiency and ease of use is always a high priority, since the ability to efficiently share documents with remote collaborators can become a significant business differentiation for any organization or individual, who will otherwise not be able to effective capitalize on markets and resources if they do not leverage suitable technologies, along with the required ability to protect sensitive business assets. This is an imperative for these organizations and individuals for their business survival. Hence there is a two-fold need to enable efficiency and productivity, while preserving safety.

Users, that include primarily information workers, have a need to efficiently author, save, share, locate, retrieve, archive and dispose documents. Other users, such as administrators and regulators, have a need to propagate policies and monitor access enforcement. Often there is a trade-off between ease of use, which is a key underpinning of efficiency, and control, which is a requirement for administration and regulatory compliance.

Present day systems can usually be grouped under either traditional 'Enterprise Class' systems, that are based on servers and services such as Active Directory and SharePoint, and emerging 'Cloud Scale' systems, such as Dropbox® and Box®, that leverage cloud services for document sharing and identity federation.

The challenge is that traditional systems tend to be brittle, antiquated, hence unable to address the emerging needs for geo-collaboration, while emerging systems provide limited functionality and safety. While traditional systems focus on safety and "intra-prise" workflows with limited and complex support for bridging across enterprises through mechanisms such as virtual private networks, emerging systems optimize for usability and global sharing and tend to come up short in the areas of access monitoring and enforcement.

The challenge in moving from traditional to emerging solutions is that this generates a schism between the enterprise, represented by the IT administrator and GRC on one hand, and the information worker on the other. Since documents have a propensity for getting lost, retained beyond their specified lifecycle, or being inappropriately modified, due to negligence, accident, malice or greed, this move to cloud systems poses an immediate risk for enterprises.

These emerging cloud-based solutions continue to leverage "old style" security that relies on the security of hardware and operating systems, and continues to require all-powerful administrators that can view, or modify sensitive data. In some cases these emerging solutions leverage federation mechanisms such as SAML (Security Assertion Markup Language) to integrate with enterprise policy and identity systems, but these are disjoint from the cloud providers own identity and policy systems for their operations staff, hence there is no trustworthy mechanism to ensure that the cloud providers actions are compliant with enterprise conveyed policies. Therefore despite any augmentation through the traditional digital equivalents of "guard dogs" and "electric fences" it is not practical to administer the administrator in the cloud that might have access to the hardware, software, or administrative interfaces of the hosted services that are outside the enterprise region of visibility and control.

Hence enterprise customers view these solutions with suspicion. This is for good reason because these cloud service providers are frequent targets of warrants and subpoenas from governments for purposes of law enforcement or surveillance. Since these are often bundled with gag orders, with severe penalties for violation, the customers may never come to know about who is looking at their sensitive data in documents that are managed through the cloud. Such an example in the United States is the National Security Letter (NSL) and many other sovereign entities have their own equivalents.

Furthermore, despite the theoretical ability of any service provider to provide higher levels of security, the critical mass of sensitive data makes them more lucrative targets of criminal and government hackers, and the consequence of a single successful intrusion is significantly more devastating.

The conventional "Enterprise Class" repositories and tools for protecting, and managing document lifecycles, have organically grown piecemeal, with incremental functionality added as needed for backup, archival, search, or rights management. This has resulted in a "Rats nest of Enterprise Infrastructures" (REI). This exacerbates the complexities when access to these repositories needs to be federated across enterprise boundaries, or if this hosting or federation is through a cloud service provider. The conventional systems and services were often designed to optimize for functionality, rather than ease of use, and also for use within a single organization. The access mechanisms for mobile and remote workers often require VPNs and add to a level of complexity that is compounded when information works are collaborating across organizations. When a mobile worker needs to access disparate repositories in distinct enterprises that are silo'd, this complexity is significantly compounded. In a sense, conventional systems are 'repository-centric' while the emerging needs are for this to be 'collaboration-centric' with the recognition that the collaborators could be working in disparate organizational, legal, sovereign, or geographic regions.

Even though emerging solutions are attempting to jettison some of those archaic complexities of SharePoint and Active Directory, they are sometimes continuing to perpetuate old metaphors of networked and distributed file systems for sharing. Therefore there is sometimes a break from convention, as is the case with the weaknesses in federation of policy for monitoring and enforcement. But in other cases the vestiges of enterprise style sharing such as those that present users with inconsistent and difficult to use file system sharing semantics, detract from the opportunity to provide 'collaboration-centric' solutions.

Present, and emerging technologies are tending to make the problems of document collaboration worse, as sharing solutions such as Dropbox® are perpetuating an archaic metaphor of networked and distributed file systems, even while solutions such as Apple iOS® move to an application-centric metaphor, which is in turn is a piecemeal solution to device access to documents. Furthermore, all of these vendors are creating additional data silos as Apple fuses iCloud into their OS-X and iOS offerings, while Microsoft does the same with SkyDrive and Windows, and Google couples GDrive with Google Apps. Third party sharing solutions such as Dropbox and Box attempt piecemeal integration with the platforms such as OS-X, iOS, and Windows, and the applications such as Google Apps, but are at business odds with the storage components such as SkyDrive, GDrive, and iCloud. Hence the present day software and service delivery model is in conflict when these third parties attempt to compete with, or dislodge end-to-end solution stacks from larger vendors such as Apple and Microsoft. All of this detracts from the ability to provide end users with 'collaboration-centric' solutions that are agnostic of platforms, applications, and cloud storage services.

There is an intense and growing need to help the end user to be more productive through document collaboration, and to help organizations be more efficient and safe in protecting their digital assets. However, it is impractical to consider any forklift changes, or expedient global standardizations to improve the existing collective REI. Due to their own business-centric needs, solution providers are exacerbating the problems by generating more data silos and exacerbating the existing REI. Users are reluctant to change their usage behavior, and re-training of the workforce would be a significant burden on organizations. Similarly, enterprise IT has significant investment in IT infrastructures, workflows and IT policies, and it would be significantly costly and complex to rip and replace these. Hence for any 'collaboration-centric' solution it is necessary to make the integration of any new systems and services occur in a manner that is mostly transparent to IWs (Information Workers) and IT Managers.

Meanwhile, users are under assault from an avalanche of information, primarily delivered through documents that they need to generate and share, or access and respond to, but their jobs are becoming increasingly more difficult, since a Windows or Office user is being cajoled to use SkyDrive, while a Google Apps customer is being lured toward GDrive. Meanwhile there is an exploding hodgepodge of specialized storage and collaboration services that address real or perceived needs. As a consequence, the purported cloud enabled services and tools for simpler, cheaper and more efficient collaboration, are tending to increase the complexities that users have to face when they need to collaborate with their peers across heterogeneous enterprise or cloud services. One of the consequences is the 'BYOD rebellion' where IWs tend to create grass roots sharing of a single cloud sharing solution, despite the security and compliance risks, because it bypasses these complexities. However this grass roots model runs into obstacles when the collaborators are on disparate cloud storage and collaboration services, and when these collaborators need to access or update documents that held in enterprise repositories, and with their collaborators that are continuing to use these enterprise repositories.

It is desirable to have methods, systems and apparatuses for a user administrating a trustworthy workspace.

SUMMARY

An embodiment includes a method of an operator provisioning a trustworthy workspace to a subscriber. The method includes providing the subscriber with the trustworthy workspace, where in the trustworthy workspace comprises a virtualized content repository with trustworthy workflows for storing, sharing and processing a digital content across a plurality of repositories. The method further includes allowing the subscriber authority to sub-provision the trustworthy workspace to one or more authorized parties, wherein only the one or more authorized parties can view or modify at least a portion of the digital content.

Another embodiment includes a system for provisioning a trustworthy workspace to a subscriber. The system includes an operator server operative to provide the subscriber with the trustworthy workspace, where in the trustworthy workspace comprises a virtualized content repository with trustworthy workflows for storing, sharing and processing a digital content across a plurality of repositories, and allow the subscriber authority to sub-provision the trustworthy workspace to one or more authorized parties, wherein only the one or more authorized parties can view or modify at least a portion of the digital content.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 5B is a flow chart that includes steps of a method for a user administrating a trustworthy workspace, according to an embodiment.

FIG. 11 is a flow chart that includes steps of a method of providing trustworthy workflow across trust boundaries between a first party A and a second party B.

FIG. 19 is a flow chart that includes additional steps of a method for monitoring and control of access to an electronic content, according to an embodiment.

DETAILED DESCRIPTION

Figure 1:
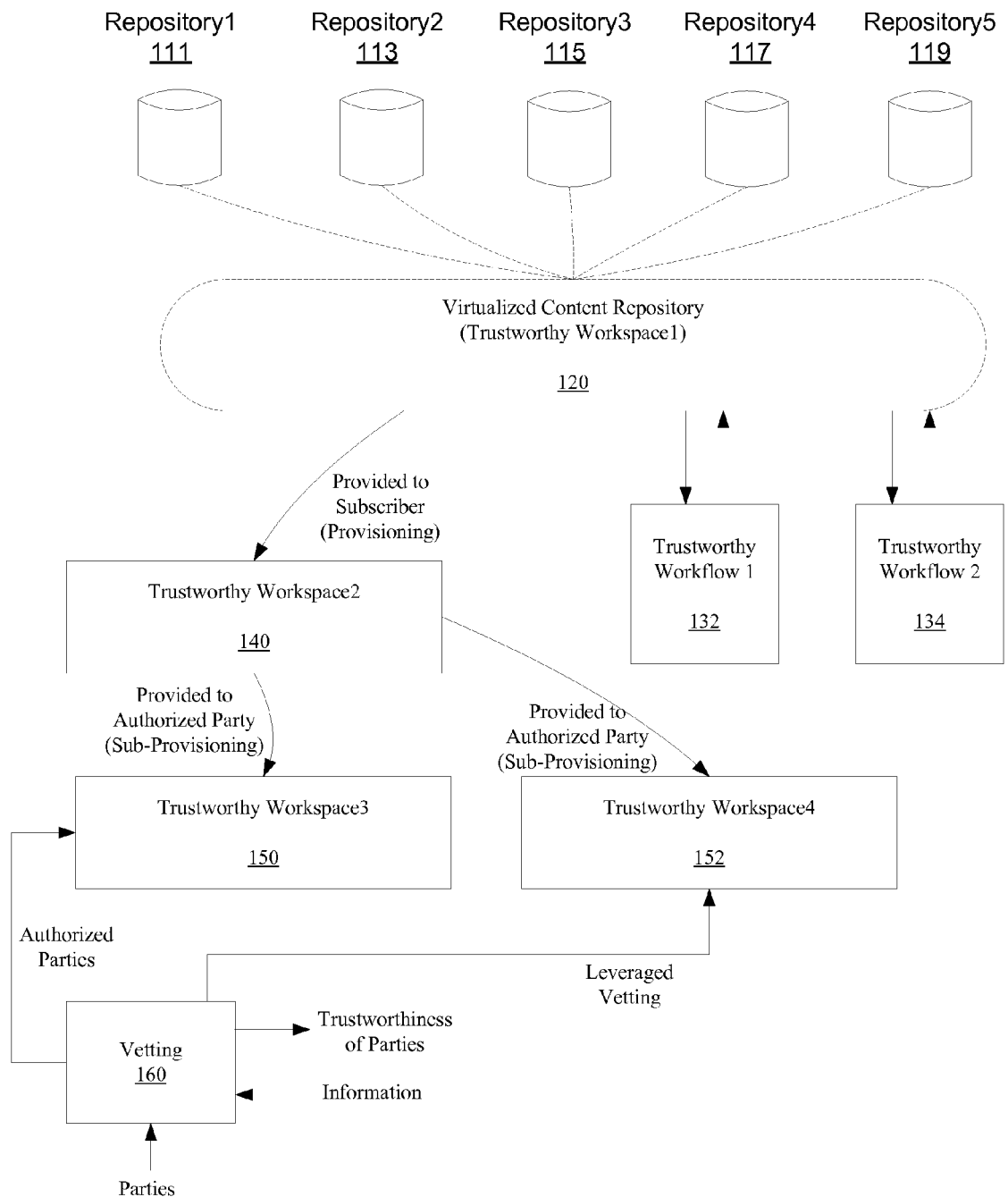
FIG. 1 shows a system for provisioning a trustworthy workspace to a subscriber.

The described embodiments include methods, systems and apparatuses for an operator provisioning a trustworthy workspace to a subscriber. The described embodiments address two of the primary obstacles to securely sharing documents across trust boundaries. These are the existence, and proliferation of silos of identity/authorization (Auth/AuthZ), and the silos of document storage and sharing repositories. The described embodiments provide systems and methods for federating these silos in a manner that reconciles the conflicting requirements of efficiency, and security.

The described embodiment for virtualization provides a consistent view of shared storage, workflows and policies, even though the underlying systems and services are disjoint and disparate. Such a workspace is trustworthy because it provides full fidelity with the access monitoring and enforcement requirements of the underlying repositories and workflows that are owned and administered by the IT of participating enterprises. Such a trustworthy workspace provides a federated and policy-based access and enforcement mechanism (in contrast with one that is centralized) and hence a viable foundation for layering collaboration-centric workflows and applications.

The complexities of operations requires the enablement of a syndication model that enables a chain of operators "upstream" that provisions and supports "downstream" operators and customers. The furthermost upstream operators are delivered the concrete storage services, albeit silo'd. Subsequent syndication downstream would add features and functionality. A generic example is Dropbox®, which is a syndicator of storage from Amazon AWS S3, delivering a simple file sharing service that is accessible through desktop synchronization agents as well as zero-footprint browsers. The form of syndication in the case is the ability to syndicate multiple disparate silos of storage and related services that might include AWS S3, Dropbox, Box and others, along with the associated trustworthiness for access monitoring and enforcement, thereby freeing the downstream syndicators and users from unnecessary complexities (through this "virtualization") so that they can focus on delivering additional features and functionality, if operators, or focus on consumption of storage at a convenient business process level, if end users, such as focusing on document workflows without needing to know about the underlying storage and communication mechanisms, while also being guaranteed safety through trustworthy mechanisms enabled through technologies such as cryptography, with appropriate trustworthy key federation.

Further, the described embodiments provide abstractions that are convenient to humans, including Circles of Trust, and Federated Repositories. The described embodiments include mapping of these to underlying social networking, rating, and identity federation systems such as SAML (Security Assertion Markup Language) and OAuth (Open Standard for Authorization), and the document repositories to existing and emerging cloud document sharing repositories such as Dropbox®.

The described embodiments accommodate an enterprise need for leveraging of their existing investments in REI (previously described Rats nest of Enterprise Infrastructures), and possibly large volumes of constituent documents, and satisfy a business need to differentiate through quality and functionality of services, and the user's need for simplicity of operation that includes making all that REI disappear from their field of perception. Further, the described embodiments address a need by users to do their business, and conduct their collaboration or commerce workflows through tools that are natural and convenient, without needing to be aware of the underlying REI.

The described embodiments provide a purpose-built rethink of document collaboration and lifecycle management that accommodates REI where necessary, since any forklift changes of enterprise infrastructure are impractical. Further, for the described embodiments, the document, or the "object" is the centerpiece, and focus is on the "demands" that constrain the handling of these objects. Further, the describe embodiments include a focus on the various and disparate roles of users, with the associated workflows, and focus on the "claims" that dictate what they can do these documents. Further, the describe embodiments include carefully leveraging of selected primitives from cryptography, a substrate of federated policy for expressive communication of demands and claims, and cloud scale systems infrastructure to integrate service providers with consumers.

The proliferation of storage is no longer an issue for the user, since each can select their repository of choice (or be cajoled or coerced by some application, organization or service provider to make a selection, such as the integration of iCloud by Apple, and Skydrive by Microsoft into their respective products). The describe embodiments include federation of the data path such that the end-user, or their software surrogate, sees a convenient façade, such as a directory hierarchy in a local file system.

This hierarchy is special in that it may represent a workflow or business process, representing perhaps purchasing, customer relationship management, or supply chains. Associated with these directory hierarchies are actions that are performed in the background in order to suitably handle documents that enter, or exit these directories.

At least some of the described embodiments allow leveraging of an off-the-shelf federated policy language, such as DKAL® (Distributed Knowledge Authorization Language) from Microsoft, to express these "idioms" which can be suitably re-used, extended, or otherwise modified, or authored.

At least some of the described embodiments leverage the promise of clouds through a syndication-friendly solution that delivers a consistent and simple end-user experience, while facilitating easy integration with existing REI, such that enterprises largely retain their existing business processes, users have less to learn or worry about.

Present day users tend to create, or participate in a multiplicity of communities that might leverage services that range from Facebook® and LinkedIn®, to mailing distribution lists and chat groups. Typically a user might be a member of personal, social, organizational or business Circles of Trust (or "Trust Circles") that they might leverage to socialize, conduct business, collaborate, or leverage in some form of support system. These are mechanisms for making personal and business connections in a manner that tend to be more comfortable and safe to users, since this form of crowdsourcing could be a more convenient mechanism for either building trust, or filtering out imposters or those exhibiting undesirable behavior.

Meanwhile, enterprises and organizations have favored the centralization of control of Auth/AuthZ (previously defined), where some officially designated individuals or roles will manage the identities and authorization. Typically these are administered through mechanisms such as Active Directory, and as these enterprises and organizations do business, they leverage mechanisms such as SAML, WS-Trust or WS-Federation, to share Auth/AuthZ responsibilities. However users, including Consumers and Information Workers, are increasingly taking identity federation into their own hands through their own Trust Networks.

This circumvention of traditional federated identity is a side effect of BYOD (bring your own device), since the users are able to collaborate through their own devices through 3/4G networks without the assistance, or the permission or knowledge of enterprise IT; they are not compelled to deal with the complexities of VPNs and traditional Identity or Resource providers. An IW (Information Worker) will most likely find it easier and more convenient to locate a collaborator or business partner online through LinkedIn, rather than to deal with the complexities of working with their partners administrators to obtain permission to perhaps access a common SharePoint repository through a VPN.

These Trust Circles are not just a convenient mechanism for users to locate each other, to build communities of trust, and to share documents and best practices, but are also excellent mechanisms for vendors to sell products and services. The described embodiments provide other areas of leverage that include layering of Auth/AuthZ over existing Trust Circles in a manner that empower Consumers and IWs to participate in becoming collective Identity or Resource Providers. The nature of crowdsourcing is that Identity and Authorization is no longer binary (Yes/No/Expired/Revoked); instead it is 'shades of grey' since the decision is now more subjective based on feedback, or based on the degree of risk of the intended transaction. For example, a user may be more discriminating about the rating of the prospective party to interact with, if the user believes that they have more to lose if that party were to diverge from specified interaction protocols, either accidentally or intentionally.

Leverage of Trust Circles is also an excellent model for integration with service delivery models, where a user can be a customer that purchases a service and then leverages a lower-cost (or free) Client Access License (CAL) to invite members of one of their Trust Circles, which reduces friction for the user to generate their desired network effect, and for the service provider to obtain market reach. The described embodiments provide seamless integration with not just conventional Auth/AuthZ, but also Service Syndication and Billing architectures.

The described embodiments provide at least one apparatus and method for integrating conventional Auth/AuthZ with emerging crowd sourced Trust Circles through an architecture that leverages a federated policy engine that leverages cryptographic protocols. The engine leverages assertions that might come from a conventional Identity or Resource Provider, thereby federating conventional enterprise models such as Role-based Access Control (RBAC) or Claim-based Access Control (CBAC), or other. It also leverages assertions that might come from Consumers or Information Workers, through mechanisms such as Endorsements or Ratings. The engine does not need to actually maintain an infrastructure for RBAC/CBAC, Endorsements or Ratings, but can integrate through adapters with existing products or services.

In the present day, there is a 'land grab' where a variety and diversity of service providers are delivering an avalanche of document sharing and collaboration services. These include SkyDrive and GDrive, which are integrated by its suppliers into their operating systems or applications, and a groundswell of new services that range from Dropbox® for file sharing, to Jive® for business networks.

The primary need for any user is to be able to easily locate and work with other users, and to be able to create, locate, save and share documents. Documents have identities that might be some function of contents, location and metadata. Users similarly have attributes that are obtained through Trust Circles that was described previously. The virtualization of repositories complements this by easing the location, storage or sharing of documents in a manner that is independent of the specific repositories.

The silos and fragmentation of repositories is not just hidden from the user by lower-level software and protocols, but can be used to the user's advantage since it is possible for the intermediation to optimize for location, service quality, or costs. It can also create replicas or archives that straddle more than one location or repository in order to add incremental value such as resilience, availability or tamper resistance.

Further, the describe embodiments provide at least one method and apparatus for virtualizing repositories through the leverage of that underlying federated policy engine with cryptographic protocols, and through utilization of existing APIs provided by AnyBox providers (such as Dropbox®, Box®, Google Drive®, Microsoft SkyDrive®, and others), and standard abstractions such as WebDAV (Web Distributed Authoring and Versioning) from the IETF (Internet Engineering Task Force, a community-based organization for recommending Internet standards). The federated policy engine utilizes Infons and Substrates, as described below, to preserve the existing repositories, APIs, and client interfaces, but is able to perform cloud-scale integration that can be efficient, resilient and secure, while shielding the user from the complexities and idiosyncrasies of the individual repositories.

The technological primitives primarily consist of federated policy engines that are augmented with cryptographic primitives. These are used to share assertions, capabilities and payloads. Payloads are the actual documents; Assertions signify policies and constraints; Capabilities provide permissions to locate and access Payloads.

End points are built out of these engines and reside within organizations and service providers (SCAs), end users (CCAs) and are hosted in cloud and network services that are potentially geo-distributed. These end points are leveraged to construct data, control and provenance paths.

The data paths facilitate bridging of disparate repositories; the control paths enable consistent enforcement of demands and claims; the provenance paths provide visibility into assertions and their veracity, and contracts and associated adherence. The describe embodiments provide a data path for virtualizing storage repositories to address the silos and fragmentation.

Any user will select their document-sharing repository of choice, without any need to normalize their selection with other users, and will enroll in this federated system. Organizations will have a similar need to select, or even host, their document-sharing repository without the need to normalize this with the selections of their peer organizations, associations, regulators, or sovereign entities. Service providers can provide federated services that either enhance data provenance and data privacy, or add arbitrary workflow capabilities, and thereby differentiate themselves through value When a user enrolls in the system, their devices leverage a client-side agent that participates in the federation, but with minimal involvement by that user. If the user is a member of an organization (or "realm") that user's agent may receive assertions from the parent organization, or the resource provider that owns a specific document that in context, and that agent may propagate provenance information to authorized parties regarding access or modification.

The user is presented with a simple and consistent usage metaphor, and the one currently in vogue is a file system integrated experience where placing documents in a folder results in the initiation of a workflow, and these folders will host new or modified documents to appear due to remote user actions. The most basic workflows are document sharing that are similar to those performed by Dropbox®, but in a manner that virtualizes these repositories such that one user might leverage Dropbox® while a collaborator might leverage Box®, or Skydrive (or "AnyBox").

As collaborators grow, more documents come in play, hence increased concurrency and conflicting changes. Whereas a baseline "Dropbox policy" would excavate these conflicts to the user to merge, a more convenient set of policies might eliminate this through workflows, where a document is forwarded to the appropriate reviewer or approver in a specific sequence, such that inappropriate conflicts are minimized or eliminated. Users meanwhile can be oblivious of the complex workflows and will just use the appropriate folders to send, receive, or track progress of workflows.

Folders can have ancillary actions associated with them, which might include the creation of backups, the update of some remote reference repository or archive, or the execution of filters and actions for generating logs or alerts. The CCAs (or "Client Connect Agents", which are off-cloud software or hardware components that reside on client laptops and devices such as tablets or smart phones) act as enforcement points that perform these filters and actions, while there are associated SCAs (or "Server Connect Agents", which are off-cloud software or hardware components that reside within customer data centers) that define these filters and actions, which are conveyed as assertions and policies between SCAs and CCAs (and between SCAs).

Just as CCAs integrate with the end user experience, or with existing applications that might access and modify documents in these special folders without knowledge of the publish and subscribe semantics, the associated SCAs integrate with existing REI to integrate with existing directories, policy authoring and decision points, and logging or alert aggregation infrastructures. An example of an SCA might be one that integrates with selected document repositories within a SharePoint server within an enterprise, and keeps versions of documents in sync between these, and peer repositories residing on AnyBox, with the associated security mechanisms such as encryption/decryption and signing/verification, such that documents that exit from SharePoint to AnyBox are just as safe as those residing within.

The current emergence of BYOD consumer grade file sharing is a reaction to, and a rebellion against the complexities of existing REI that forces complex client-side software for creating VPNs, and forces choices of client-side platform software. The baby that is tossed with the bathwater is the huge base of existing documents that currently reside in existing file systems and document repositories such as SharePoint and Documentum.

The SCA is similar in function to the CCA, but is specialized to have knowledge of these repositories through a custom provider model, such that these existing enterprise file servers and SharePoint repositories can become end points in that seamless user collaboration. In this model, existing users and software will continue to access existing enterprise repositories, while the SCAs will serve as a trustworthy two-way bridge for propagating data, control and provenance with other SCAs and CCAs. Typically data might constitute documents being shared, and control might consist of policies and cryptographic material such as encrypted keys or signatures, and provenance is typically cryptographically verified proofs of the antecedents of the data or control information.

Enterprises have their own mechanisms for managing identity and authorization. These might be based on Active Directory and Kerberos. In these cases the access control is enforced by the document containers, such as file systems and SharePoint, which are "kerberized" for federating within an organization. As these enterprises and organizations federate for business, there are emerging standards and infrastructures for federating across organizations. These range from SAML (OASIS), and WS-Trust/WS-Federation (Web Consortium), to PKI and hybrids.

These federation mechanisms attempt to tame the complexities of REI silos, but do not provide any guarantees regarding misuse of assets by remote collaborators. The SCA is also designed to integrate with these enterprise directories and security policies such that the group memberships (and evictions) are enforced for that organization's assets (documents) anywhere in the federated data paths. As a consequence, administrators and regulators continue to leverage their existing mechanisms for specifying policy and memberships, and mechanisms for viewing logs and alerts, while their SCAs translate these into assertions and receives logs and alerts from remote SCAs and CCAs.

The twin benefits of the SCAs is that the REI can exist in place without the need for additional complexity due to the proliferation of document sharing data silos, and enterprise administrators and regulators do not need to acquire any new skills or encounter any new complexities. Moving forward, there is an opportunity for enterprises to selectively and deliberately whittle down this REI because the visibility and control can be enabled through an "SCA Lite" that can reside on a mobile device, since the cryptographic operations enable offload of significant functionality to the cloud in a trustworthy manner.

The core component for federation of data, control and provenance across SCA and CCA endpoints, mediated through CCS ("Cloud Connect Service") service providers is a federated policy engine.

Present day computing infrastructures that were designed for enterprises have difficulties accommodating cloud hosting and services because they are inherently "distributed" in that there is a need for centralized parties that are usually fully trusted that will host and manage the sharing of documents and the federation of identity and authorization. While this has mostly worked for traditional "Intra-prise" scenarios (i.e., within a single organization) this does not scale when there are multiple organizations and individuals working across trust boundaries, hence unable or unwilling to trust a single centralized party for managing identities, authorization, keys, policies, logging and enforcement.

Policy engines tend to be similar in that they require centralized engines that are fully trusted. There are new generations of policy engines, such as DKAL® from Microsoft, that are intrinsically federated in that they leverage an underpinning of knowledge of "who can say what", and "what is known" (rather than "what is true").

DKAL operates on primitives termed Infons and Substrates. At its core, an Infon is a message that is exchanged between end points that could extend the knowledge of the recipient(s), and a Substrate is a repository of information that is another candidate source of knowledge. At least some of the described embodiments leverage and extend these Infons and Substrates through cryptographic techniques, to represent attestations of what needs to be done (demands) what a principal is authorized to do (claims) and what transpired (logs and alerts). At least some of the described embodiments also modify and extend DKAL for performance and efficiency.

DKAL was designed to integrate with existing federation infrastructures such as SAML, such that an Infon (a message that is exchanged between end points that could extend the knowledge of the recipient(s)) can represent a SAML claim, and with emerging policy federation standards such as XACML (eXtensible Access Control Markup Language) from Oasis, such that DKAL can integrate with peer policy decision points (PDPs) and enforcement points (PEPs), by serving as a PDP to remote XACML PEPs, and as a PEP to remote XACML PDPs.

At least some of the described embodiments integrate Authorization/Enforcement engine that integrates federated policy and cryptography we term a TrustNode. A TrustNode consists of a cryptographic engine that currently leverages OpenSSL, and a lightweight inference engine. There is a TrustNode that is resident within every CCA, SCA and CCS. This TrustNode also contains a credential vault and a directory for storing signed public keys and encrypted secret keys. It also contains a policy store that consists of a Substrate and an Infostrate.

Policy Infons and Substrates are generated through an SCA Adapter that knows about existing policy repositories, through an adapter that integrates with an existing Policy Authoring Point, or through an adapter that integrates with other policy engines such as XACML (eXtensible Access Control Markup Language).

Policy Infons and Substrates codify claims (such as employment, group membership, or administrative roles) and demands (such as Role-Based Access, Claims-based Access, or other resource access restrictions). These Infons are also designed to integrate with emerging cryptographic techniques such as Cipher text Policy or Key Policy Attribute-based Encryption (where the former might represent demands, and the latter, claims).

Infons and Substrates also codify behavior. A Behavioral Infon is a declarative prescription of the actions that need to be performed when a document is added to an associated folder. It may specify the type of cryptographic techniques to be applied; perhaps for non-repudiation and privacy, the required security strength, it may also specify associated obligations such as logging and alerts. There may be other obligations such as the need to archive or quarantine (block) that document if it triggers any specified patterns.

Behavioral Infons also specify the target repository (or repositories) for an outbound document, based on its federated substrate that is able to locate and associate preferred data repositories of the recipient, or that recipient's organization. In this regard, the substrate functions as a federated directory for documents and principals.

Documents that are associated with demands and cryptographically protected are also Infons in this system. A Document Infon typically consists of an encrypted payload that represents the original document, and an associated header that contains demands and capabilities. Typically the demands are delivered to the CCA and optionally to a remote Mediator, who will need to agree to co-operate based on their respective Substrate and Infostrate content. A successful mediation unlocks the capabilities in the header that will give the intended recipient access to the payload.

Finally, Infons and the contents of Substrates also codify actions that occurred, such as documents that were sent or received. These Infon Logs are cryptographically attested and protected records of actions that occurred, and are tamper evident. All types of Infons are tamper evident, and the architecture also accommodates tamper prevention of Infons. At least one benefit of the described embodiments includes the ability for individuals and organizations to leverage the benefits of clouds and other networks, which include lower costs, higher scale, and geo-distribution, in order to maximize their own efficiencies that might include lower capital and operational expenses.

There exist several collaboration and commerce networks that can benefit from the lower costs, scale and geo-distribution of clouds. These networks include supply and demand chains, and international trade. In the present day there is a precise support system that includes banks, escrow parties, shipping corporations, and mediation. However these do not scale for electronic commerce, when it is necessary for a human to be a mandatory intermediary for any typical transaction (as opposed to a human needing to get involved in the case of an error or a conflict).

Due to the replacement of that the previously described "messy crossbar" with a trustworthy hub, it is now easier for diverse technologies and solutions to integrate and inter-operate, since each spoke needs to perform a one-time integration with the trustworthy hub. In addition, it is possible for the hub to present a variety of interfaces to the spokes, and then perform the routing and inter-operation within the hub. In deployment scenarios with multiple hubs, each hub might implement a specific class of technologies.

Whereas present-day distributed architectures are stilted due to the need to protect data through the containers that they reside in, the enablement of visibility and control facilitates the caching of electronic content closer to the expected consumer, which optimizes the data path, whereas the control path for key access and for metering is easier to optimize for cloud scale. This provides the underpinning for new architectures that enable higher-scale and greater efficiency, noting that the current corporate and Internet traffic is dominated by video and file sharing.

FIG. 1 shows a system that allows an operator to provision a trustworthy workspace to a subscriber. The system includes a virtualized content repository 120 that includes a trustworthy workspace1. Associated with the virtualized content repository 120 are trustworthy workflows 132, 134 for storing, sharing and processing a digital content across a plurality of repositories 111, 113, 115, 117, 119.

As will be described, the virtual content workspace can be managed by one or more servers of a custodian, which manage the plurality of repositories 111, 113, 115, 117, 119, and can further manage workflows 132, 134. For an embodiment, the one or more servers of the custodian are network connected to the plurality of repositories 111, 113, 115, 117, 119. Further, the one or more servers of the custodian are network connected to servers of parties (such as party A and party B of later discussion) and to servers of other custodians (such as, higher level custodians discussed later). The other trustworthy workspaces 150, 152 can be similarly managed, maintained and controlled by other custodian servers. Further, the one or more servers of a custodian can be network connected to servers of curators. The described methods of operation can be implemented through software operating on one or more of the described servers or computing devices.

For an embodiment, an operator is able to provide a subscriber with at least a portion of the trustworthy workspace) of the virtualized content repository 120, as depicted by the trustworthy work space2 140. Further, the subscriber is provided with the authority to sub-provision the trustworthy workspace2 140 to one or more authorized parties as depicted by the trustworthy workspace3 150 and the trustworthy workspace4 152. For an embodiment, only the one or more authorized parties can view or modify at least a portion of the digital content of the trustworthy workspace3 150 and the trustworthy workspace4 152.

It is to be understood that while the trustworthy workflows 132, 134 are figuratively depicted as being associated with the trustworthy workspace 1 120, the trustworthy workspace2, 140 and the trustworthy workspace3 150 are provisioned from the trustworthy workspace 1 120, and therefore, for at least some embodiments, the trustworthy workflows 132, 134 are associated with the trustworthy workspace2, 140 and/or the trustworthy workspace3 150.

For at least some embodiments, an operator is an organization that provides a cloud service to its customers, with some or all of associated services such as provisioning, metering, billing, and customer support, and others. Examples of operators include document-sharing operators such as Any-Box®. Other operators might provide services such as identity federation.

A Virtualized content repository is "virtual" in that it is a composite of one, or more discrete and real repositories, and contains some combination of hardware, software and service components that provide an aggregate, common and consistent interface to the consumer of that virtualized repository, such that the consumer continues to use the underlying concrete repositories, but is shielded from the specifics, and perhaps limitations of the underlying repositories. For instance, such virtualization might mask the fact that the underlying concrete repositories are geo-distributed across the globe, while the virtualization provides the consumer with the best performance based on their specific location. Other virtualization aspects might normalize the user experience, the manageability experience, or other aspects of the underlying repositories, such that the consumer is provided with a common, consistent, and hopefully simple access interface.

An example of plurality of repositories includes a collection of document sharing repositories from Dropbox, Box, SkyDrive, GDrive and Amazon S3. Furthermore, some of these repositories might host multiple disparate locations. An aggregation from this plurality might select from disparate storage providers, and disparate geographic locations, such that the consumer of the overlaid virtual repository might perhaps be provided with higher levels of reliability and availability (since their data might reside in multiple copies across different repositories) and perhaps more competitive pricing if the virtualization layer might pick from the repository vendors that are providing the most competitive pricing for the desired value.

As described, at least some embodiments allow the subscriber authority to sub-provision the trustworthy workspace to one or more authorized parties. Provisioning is a process where an operator would make some portion of their trustworthy workspace to one or more of their customers. It is possible for any of those customers to serve as an operator and to "sub-provision" portions of that trustworthy workspace that was provisioned previously to them.

Examples of trustworthy workflows might include supply chains, marketplaces, auctions, and extranets. All of these involve the sharing of sensitive business data such as design documents, offers, bids, contracts, etc. It is a business imperative for participants in these workflows to protect themselves from accidental or intentional deviation from these workflows for reasons that might include fraud. It is also a similar business imperative for these participants to prove to their business partners that they have correctly participated in these workflows. Workflows are everywhere, and range from paper (with conventional mail exchange), to end-to-end electronic workflows that sometimes leverage VANs (Value-Add Networks.) All of these workflows tend to be prone to failures and tend to be difficult to protect against misbehavior and accident by participants that could consequently lead to business loss. Trustworthy workflows leverage cryptography, including primitives such as signing, encryption and others. These cryptographic controls provide an enhanced degree of trust across participants. Since "trust" is grounded in the physical world, and is a function of relationships, history of interaction, contracts, etc, "trustworthiness" is defined to be an intrinsic property of the cryptographically enabled workflows to express that the "trust" is replaced by the intrinsic "trustworthiness" of the cryptographic primitives that preclude participants from cheating.

For at least some embodiments, only the one or more authorized parties can view or modify at least a portion of the digital content. That is, only the authorized parties are able to participate in the trustworthy workflows 132, 134.

For an embodiment, the authorized parties are determined by a vetting engine 160. The vetting engine receives parties, and qualifies or vets the parties based on information of the parties. The information includes, for example, identities, reputations, and/or associations of the parties.

Such a vetting engine might leverage "big data" analytics to glean information from disparate sources that might include feedback from users in the system. Based on the available data, it might leverage rules and heuristics to suggest a level of trust that might be assigned to an individual (or organization).

The results of vetting of the parties can be leveraged by, for example, other subscribers, or for example, for the determination of authorized parties to different trusted workspaces. Further, for at least some embodiments, the vetting of the parties provides a level of trustworthiness of each of the parties. For an embodiment, the vetting is transitive since a subscriber will trust the vetting process of another subscriber based on the first subscriber's trust in the second. The vetting engine of the first subscriber can incorporate this degree of trust into the act of importing and acting on the vetting information propagated by the second subscriber.

Figure 2:
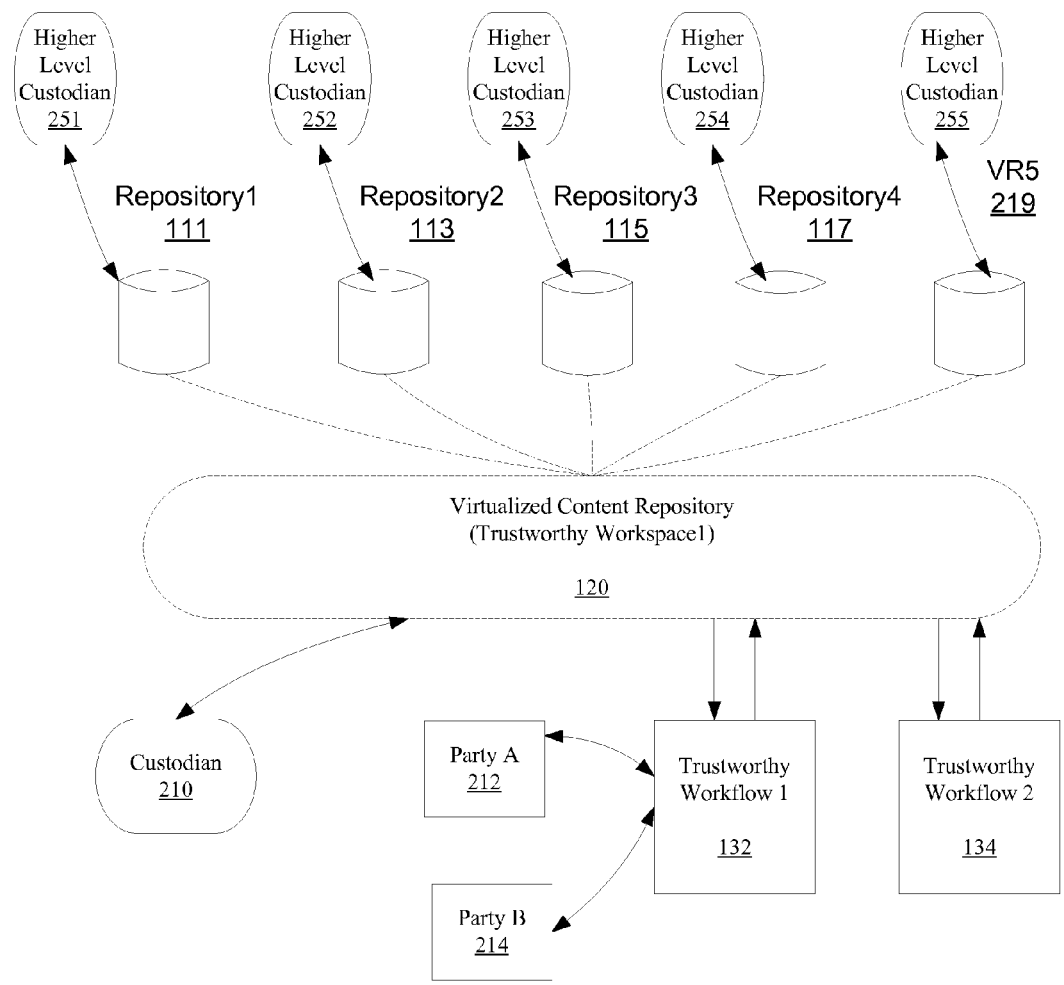
FIG. 2 shows a system for provisioning a trustworthy workspace to a subscriber.

FIG. 2 shows a system for provisioning a trustworthy workspace to a subscriber. FIG. 2 includes a custodian 210 that manages or enables the workflows (such as, trustworthy workflow 132 or trustworthy workflow 134) utilizing the virtualized content repository 120. Additionally, as shown, each of repositories 111, 113, 115, 117, 219 are managed by "higher level" custodians 215, 252, 253, 254, 255. As shown, one of the repositories 219 is itself a virtual repository. Note that a single custodian may serve or provide the role of any of the mentioned custodians. Party A 212 and Party B 214 utilize one or more of the workflows 132, 134 as managed by the custodian 210. Clearly, additional parties and workflows can be included.

Figure 3:
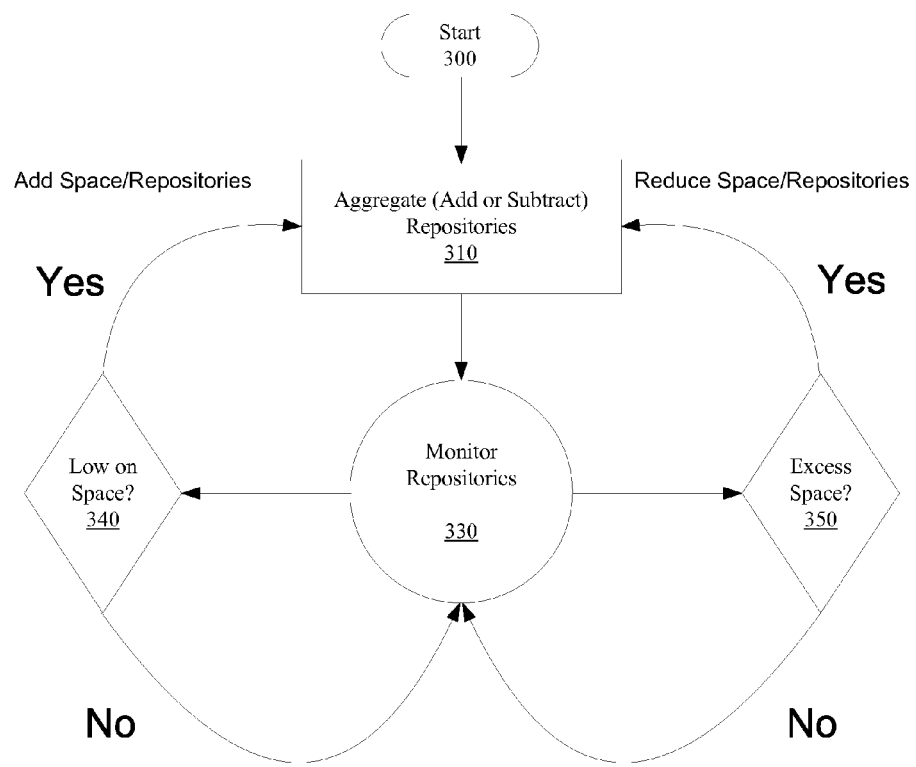
FIG. 3 is a flow chart that includes steps of a method of one or more servers that are operative to manage a virtual workspace, according to an embodiment.

FIG. 3 is a flow chart that includes steps of a method of managing a virtual workspace, according to an embodiment. The management of the virtual workspace can be performed by one or more servers. After starting 300, according to this embodiment, management (monitor repositories 330) of the virtual repository includes aggregating by adding or subtracting space or repositories 310. The one or more servers are operative to monitor the repositories of the virtual workspace. That is, if the storage space of the virtual workspace is determined to be low 340, the management (330) of the virtual workspace adds space/repositories. If the storage space of the virtual workspace is determined to be to high (excess) 350, the management (330) of the virtual workspace is able to save money and resources by reducing the space/repositories associated with the virtual workspace.

Figure 4:
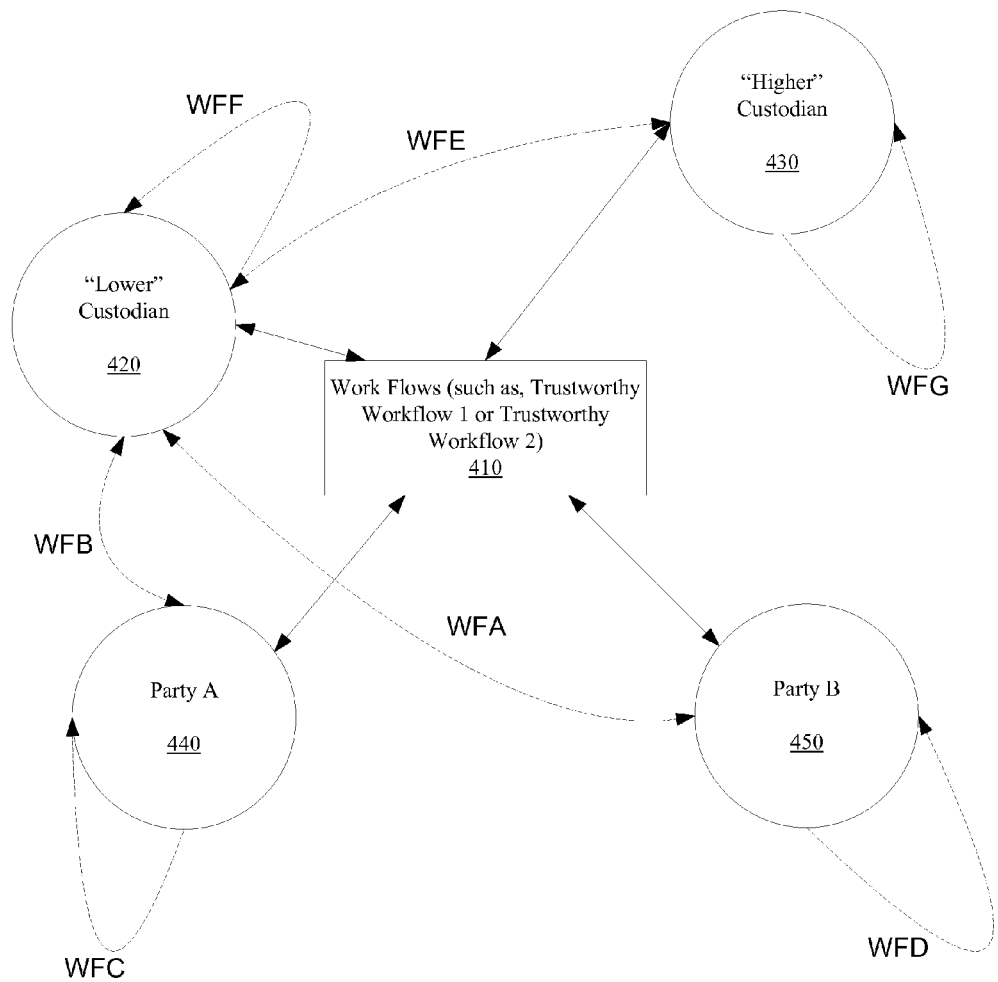
FIG. 4 shows workflow relationships that can exist between a custodian and one or more parties, according to an embodiment.

FIG. 4 shows workflow relationships that can exist between a custodian and one or more parties, according to an embodiment. This embodiment shows that for any number of workflows 410 associated with a virtual workspace, many different workflow relationships are possible between the different entities associated with the virtual workspace. For example, parties A 440 and B 450 can have workflow relationships (WFA,WFB) with a "lower" level custodian. Further, the parties A and B can have workflow relationships (WFC,WFD) with themselves. Further, the "lower" level custodian 420 can have workflow relationships with a "higher" level custodian 430 (WFE) and itself (WFF). Further, the "higher" level custodian can have a workflow relationship with itself (WFG). The discussion here is not intended to provide an exhaustive list of possible workflow relationships between the entities associated with a virtual workspace, but rather, to illustrate that there are many different workflow relationships that can be established.

Figure 5A:
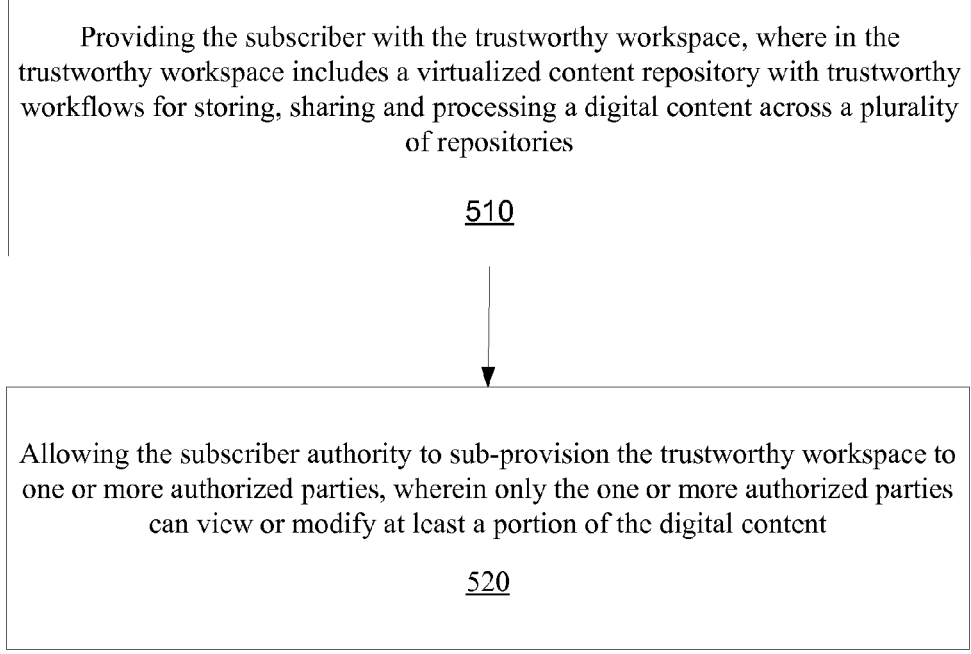
FIG. 5A is a flow chart that includes steps of a method for provisioning a trustworthy workspace to a subscriber, according to an embodiment.

FIG. 5A is a flow chart that includes steps of a method for provisioning a trustworthy workspace to a subscriber, according to an embodiment. A first step 510 includes providing the subscriber with the trustworthy workspace, where in the trustworthy workspace includes a virtualized content repository with trustworthy workflows for storing, sharing and processing a digital content across a plurality of repositories. A second step 520 includes allowing the subscriber authority to sub-provision the trustworthy workspace to one or more authorized parties, wherein only the one or more authorized parties can view or modify at least a portion of the digital content.

For an embodiment, the one or more authorized parties include at least one of a publisher or a consumer of the digital content, or an administrator of the trustworthy workspace.

An embodiment further includes providing the subscriber with the trustworthy workspace includes the operator providing the subscriber with a primary workspace, wherein the subscriber has a delegated authority to create nested trustworthy workspaces, or groups, thereby allowing subsets of the one or more authorized parties to access digital content shared with each nested trustworthy workspace reside across the plurality of repositories.

For an embodiment, the authority to provision the trustworthy workspace includes access controls and authorization, which enables the authorized parties to provide at least an electronic identification (such, as an email address, a cell phone number, etc.) of another party which triggers an automated trustworthy workflow to invite and enroll the other party, and to facilitate the other party joining the trustworthy workspace. For an embodiment, the authority to provision the trustworthy workspace to the one or more authorized parties includes allowing the one or more authorized parties to at least one of create, enable access, delete, change, monitor, the electronic content in the trustworthy workspace.

At least one embodiment further includes facilitating the subscriber in vetting one or more other parties before allowing the one or more other parties to access the trustworthy workspace, based on information of the one or more other parties, wherein the one or more other parties become authorized parties if vetted more than a threshold. For at least some embodiments, the information of the one or more other parties includes at least identities of the one or more other parties. For at least some embodiments, the information further includes at least one of reputations, associations of the one or more other parties.

For at least some embodiments, the methods and processes for identities leverages integration with SAML, OAuth, and other mechanisms as described previously. The methods and processes for obtaining reputations and associations are specific to the workflows. For example, in a marketplace scenario the input might be obtained from rating systems in silo marketplaces such as EBay and Amazon. If this were a business extranet scenario then there would be services that would enable partners to provide feedback on each other. It is commonplace today to observe a growing number of such services where there are even a multitude of services for patients to rate doctors, or for students to rate teachers. Similarly in International Trade and Global Commerce, these services for providing ratings and associations can be leveraged for computing the consequent reputations in the vetting process.

At least some embodiments further include allowing other subscribers to leverage vetting of at least some of the one or more other parties based on prior vetting by the subscriber. For at least some embodiments, leveraging includes providing the ability for any subscriber to release the output of their vetting process to other subscribers to leverage in their vetting engines. This is similar in concept to the rating system of EBay for instance, but the orchestration is federated in that there is on central party that needs to host this information (thereby also being in a position to filter or modify the feedback due to either coercion, malice, or for profit). Furthermore, for an embodiment, the publisher of this information leverages a certain level of anonymization in order to protect their won identity against perhaps repercussion. Consequently this anonymity might deem the feedback to be less believable. Hence the vetting engines leverages statistics and also co-relates to filter out feedback that might be deliberately duplicated or apparently falsified.

For at least some embodiments, a level of vetting influences a level of trustworthiness associated with each of the one or more other parties, and wherein the vetting further comprises accessing information from a plurality of sources including social networking and reference sources. Typically the requisite level of trustworthiness is subjective and hence depends on the level of risk that the first party is willing to take. In addition, the level of trustworthiness depends on the sensitivity of the transaction being considered, and the consequent degree of loss if there is accident or malice in the actions of the other party. For example, one might require higher level of trustworthiness from a diamond merchant than from a vendor of office supplies.

For at least some embodiments, the trustworthy workspace includes one or more policies, wherein the one or more policies include actions to be taken for publishing and consuming digital content to and from the trustworthy workspace. For at least some embodiments, the actions include at least one of data classification, encryption, signing, rights management, routing, quarantine, log, archive, replication, disposition, or redaction of the digital content.

For at least some embodiments, the trustworthy workspace comprises management of a plurality of different repositories and the trustworthy workspace is presented to the operator as a single unified management interface while utilizing the plurality of different repositories. For example, Dropbox® and Box® have dissimilar mechanisms for provisioning users with their own storage within an account. Therefore if an administrator faces compounding of complexities if they needed to have knowledge of every such service, especially when these services are multiplying, and attempting to differentiate through features that include manageability. On the other hand, the virtualization of provisioning provides a consistent façade that bypasses these complexities.

For at least some embodiments, the trustworthy workspace comprises management of a plurality of different repositories and the trustworthy workspace is presented to the subscriber as a single unified workspace while utilizing the plurality of different repositories.

As will be described in detail, for an embodiment, the trustworthy workflows include providing trustworthy workflow across trust boundaries between a first party A and a second party B. Further, as will be described, for an embodiment, trustworthy workflows include monitoring and controlling access to an electronic content.

FIG. 5B is a flow chart that includes steps of a method for a user administrating a trustworthy workspace, according to an embodiment. A first step 512 includes providing, by one or more operator servers, the subscriber with the trustworthy workspace, where in the trustworthy workspace comprises a virtualized content repository with trustworthy workflows for storing, sharing and processing a digital content across a plurality of repositories. A second step 522 includes allowing, by the one or more operator servers, the subscriber authority to sub-provision the trustworthy workspace to one or more authorized parties, wherein only the one or more authorized parties can view or modify at least a portion of the digital content. A third step 532 includes facilitating the subscriber in vetting one or more other parties before allowing the one or more other parties to access the trustworthy workspace, based on information of the one or more other parties, wherein the one or more other parties become authorized parties if vetted more than a threshold, wherein the information of the one or more other parties comprises at least identities of the one or more other parties, and wherein the information further includes at least one of reputations, associations of the one or more other parties.

For at least some embodiments, the trustworthy workspace comprises a directory. For at least some embodiments, the directory (trustworthy directory) includes a known, common location (such as an IP address or http URL) for a subscriber to publish any information for use by another subscriber in a common format and vocabulary such that the other subscriber gets a complete, unrestricted and untampered view of what was published. For at least some embodiments, the subscriber is not prevented from publishing to the directory. For at least some embodiments, erasure coding and dispersal enable records of the trustworthy directory to remain intact even when attempts are made to destroy. For at least some embodiments, authenticated data structures enable detection of records of the trustworthy directory that are inserted or deleted separately.

For at least some embodiments, the directory enables a trustworthy mechanism for a user to discover other users. For at least some embodiments, the subscriber who discovers or queries the directory can do so while being maintaining the anonymity of the subscriber and the privacy of the query. This trustworthy mechanism comprises of cryptographic signing, verification and encryption/decryption of the records of the trustworthy directory.

For at least some embodiments, the trustworthy workspace further includes a messaging service which leverages the directory to enable the subscriber to discover other subscribers or users who have not yet subscribed, and further includes determining if the users who have not yet subscribed are authorized; and inviting the users who have not yet subscribed to join the trustworthy workspace and to become subscribers. For at least some embodiments, subscribers have authorization to access and use the trustworthy workspace. For at least some embodiments, the subscribers have authorization to access and use the trustworthy workspace, wherein access and use includes an ability to send and receive messages.

At least some embodiments further include allowing a recipient to associate a rating with a sender based on the content of message received through the messaging service. For at least some embodiments, a recipient who receives an unsolicited message may mark that sender as being undesirable or low value and therefore associate a low rating that can be referenced by other subscribers. At least some embodiments further include aggregating of ratings, and enabling a policy on the sender to disallow or reduce an importance of messages being sent by the sender. For at least some embodiments, the aggregating includes an aggregation of individual ratings by multiple recipients to influence the rating. The credibility of the rating improves with the number of ratings for a sender. At least some embodiments further include allowing the recipient to associate the rating with the sender based on credentials used by the sender to verify themselves to the workspace. For at least some embodiments, a credential is an assertion by an external identity provider. For at least some embodiments, the credential includes one or more of a secret passphrase or a SmartCard. At least some embodiments further include rating the sender based on a number of recipients and a frequency of messages sent by the sender. For an embodiment, the frequency of messages is the number of messages within a certain epoch. At least some embodiments further include allowing the recipient to associate a personal rating to the sender of an email to blacklist the sender.

Figure 6A:
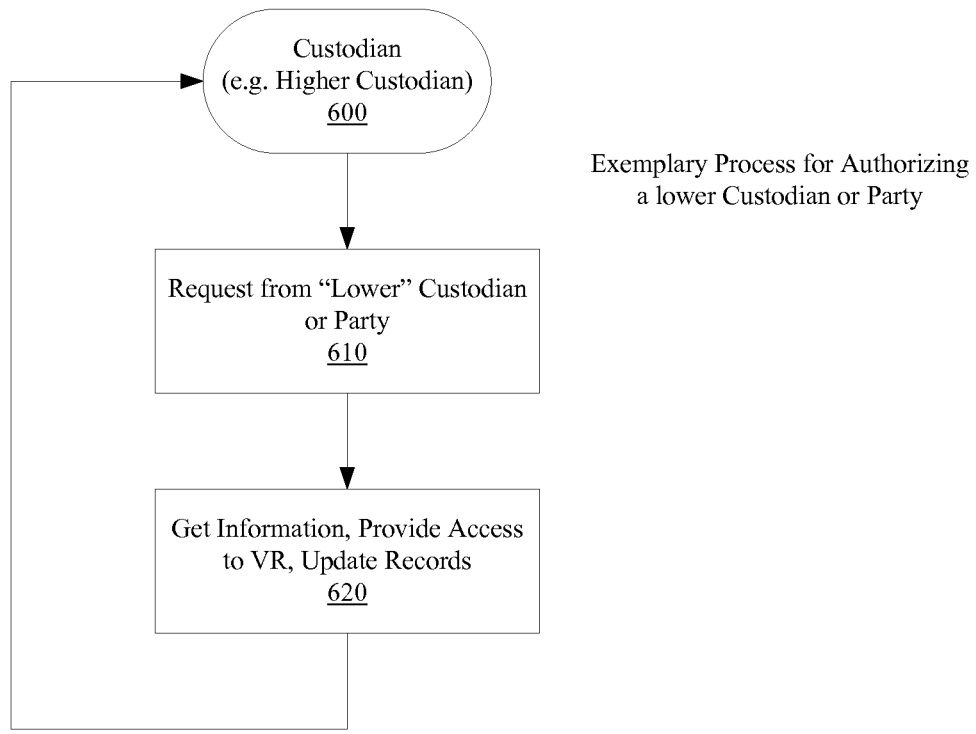
FIG. 6A is a flow chart that includes steps of a method of authorizing a lower custodian or a party, according to an embodiment.

FIG. 6A is a flow chart that includes steps of a method of authorizing a lower custodian or a party, according to an embodiment. A custodian (Higher Custodian) 600 receives a request from a "lower" custodian or party 610. The custodian can then perform the previously describe vetting processes for authorizing the lower custodian or party, thereby allowing the authorized lower custodian or authorized party to utilize the workflows associated with the virtual workspace being managed by the custodian (Higher Custodian) 600. The custodian (Higher Custodian) 600 then obtains information about the authorized lower custodian or authorized party, provides access to the virtual repository (VR—the virtual workspace), and then, for example, updates records associated with the authorized lower custodian or authorized party 620.

Figure 6B:
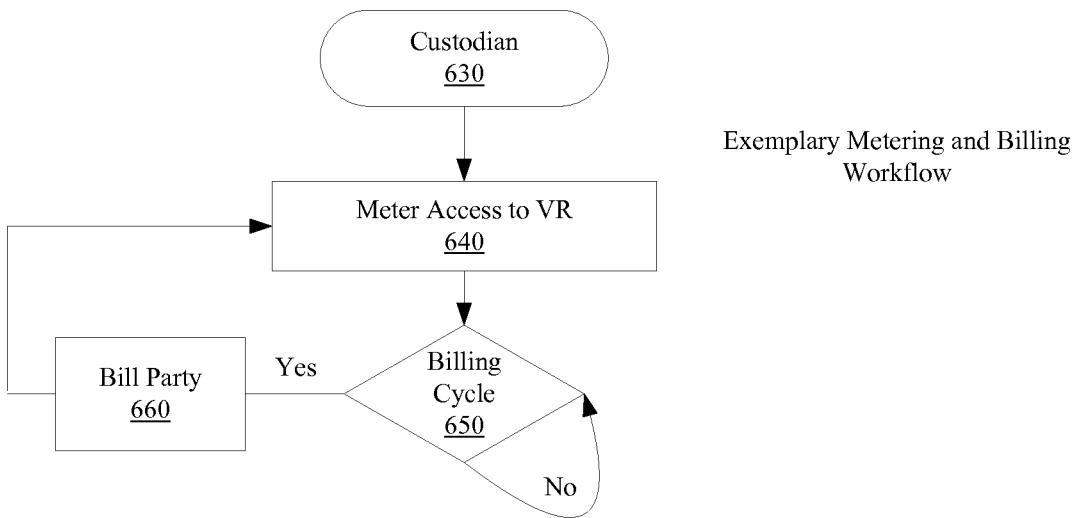
FIG. 6B is a flow chart that includes steps of an exemplary method of metering a billing, according to an embodiment.

FIG. 6B is a flow chart that includes steps of an exemplary method of metering a billing, according to an embodiment. This is merely one example of a workflow associated with the authorized lower custodian or authorized party. The custodian 630 of the VR (virtual repository) meters access to the VR 640. Further, the management of the VR 640 includes monitoring billing cycles 650. If a billing cycle is detected, the authorized lower custodian or authorized party is provided with a bill 660.

Figure 7:
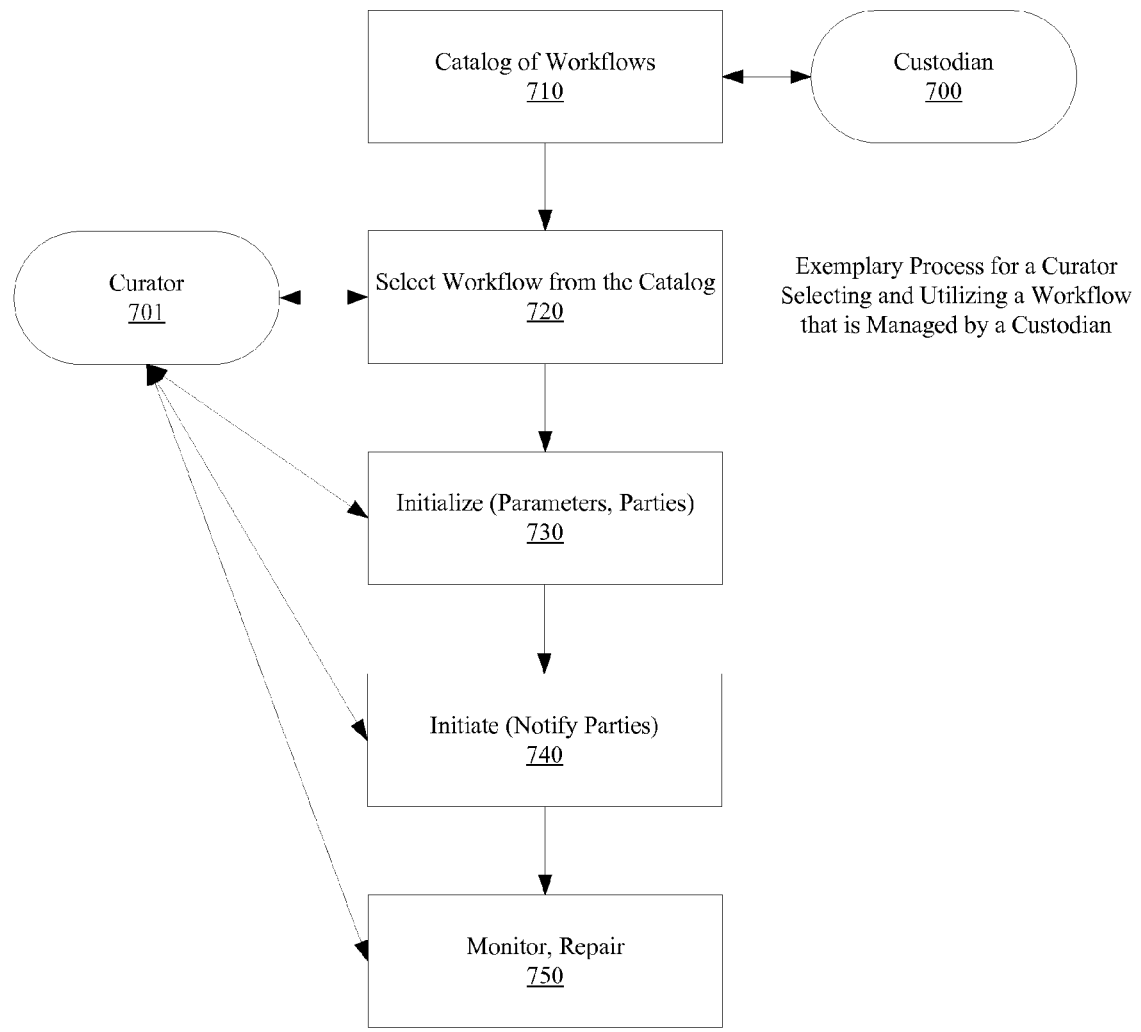
FIG. 7 is a flow chart that includes steps of a process of a curator selecting and utilizing a workflow that is managed by a custodian, according to an embodiment.

FIG. 7 is a flow chart that includes steps of a process of a curator selecting and utilizing a workflow that is managed by a custodian, according to an embodiment. This flow chart provides an example of the interactions that can occur between a custodian that manages and enables workflows, and a curator who owns the workflow and is ultimately responsible for the workflows. A first step 710 includes a custodian 700 providing a catalog of workflows that are available for use. A second step 720 includes a curator 701 selecting one or more workflows from the catalog of workflows. A third step 730 includes the curator initializing (with parameters and parties) the workflow. A fourth step 740 includes the curator 701 initiating (for example, notifying parties) the workflow. A fifth step 750 includes the curator monitoring and/or repairing the workflows as needed.

Figure 8:
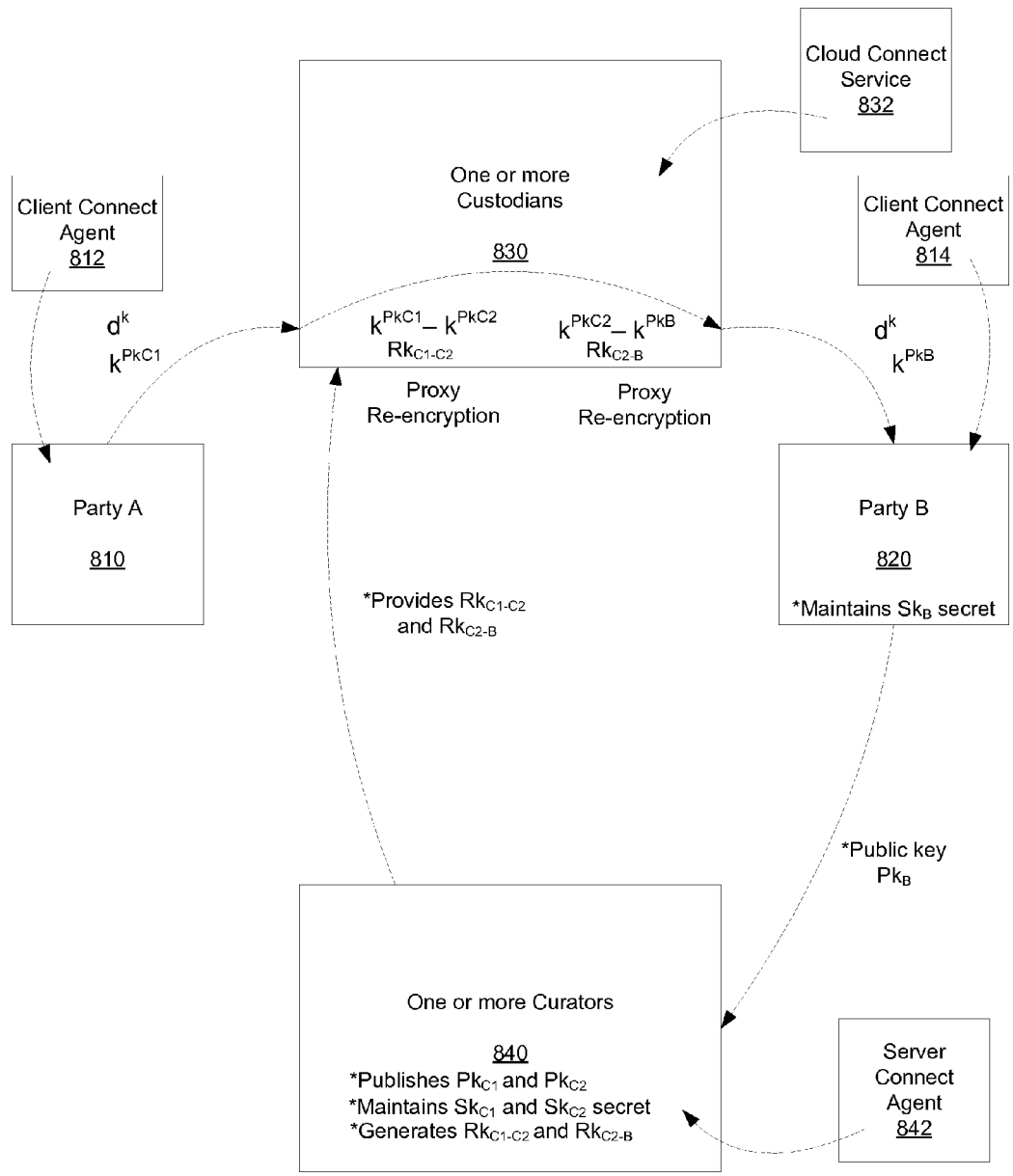
FIG. 8 shows a system that provides trustworthy workflow between a first party A and a second party B, according to an embodiment.

FIG. 8 shows a system that provides trustworthy workflow between a first party A and a second party B, according to an embodiment. As shown, this embodiment includes one or more custodians 830, and one or more curators 840 that provide trustworthy workflow between the first party A 810 and the second party B 820. Each of the one or more custodians 830, the one or more curators 840, the first party A, and the second party B include one or more servers, wherein each server includes at least one or more processors and memory. The one or more servers of each of the one or more custodians 830, the one or more curators 840, the first party A, and the second party B, are electronically connected through a computer network.

As shown, for at least one embodiment, the one or more custodians 830 have access to a cloud connect service (CCS) 832, one or more curators 840 have access to a service connect agent (SCA) 842, and the first party A and the second party B have access to client connect agents (CCA) 812, 814.

For at least some embodiments, a curator includes organizations or individuals who are the owners of information and its associated management/access policies. As shown, the one or more curators 840 generating a first public key ($PK_{C1}$) and a second public key ($PK_{C2}$), which are then published. The first public key ($PK_{C1}$) and the second public key ($PK_{C2}$) have a corresponding secret first secret key ($SK_{C1}$) and a second secret key ($SK_{c2}$) which the one or more curators maintain as a secret.

The one or more curators 840 also generate a first proxy re-encryption key ($RK_{C1-C2}$) and a second proxy re-encryption key ($RK_{C2-B}$). While this embodiment includes two proxy re-encryption keys, it is to be understood that other embodiments include any possible number of proxy re-encryption keys. For at least some embodiments of this example, the one or more curators 840 generate the second proxy re-encryption key ($RK_{C2-B}$) based on a public key $Pk_B$ obtained from the one or more custodians. That is, the one or more curators 840 generate the second proxy re-encryption key ($RK_{C2-B}$) without knowledge of the secret key $SK_B$ of the second party B.

For one embodiment, the first proxy re-encryption key ($RK_{C1-C2}$) and the second proxy re-encryption key ($RK_{C2-B}$) are both generated by a single curator. Further, the corresponding secret first secret key ($SK_{C1}$) and a second secret key ($SK_{C2}$) can be generated by the single curator. For another embodiment, the first proxy re-encryption key ($RK_{C1-C2}$) is generated by a first curator, and the second proxy re-encryption key ($RK_{C2-B}$) is generated by a second curator. Further, the corresponding first secret key ($SK_{C1}$) can be generated by the first curator, and a second secret key ($SK_{C2}$) can be generated by the second curator. The multiple (multiple hop) proxy re-encryption of the described embodiments is advantageous because it provides for the federation of enforcement of policies across trust boundaries.

The first party A encrypts data d, using a block cipher key k (denoted as $d^k$ in the Figures), then encrypts k using the first public key, $PK_{C1}$ (denoted as $k^{PkC1}$ in FIGS. 8, 9 and 10), that is to eventually be received by the second party B.

The one or more custodians 830 receive the encrypted data from the first party A, as well as the encrypted k. For at least some embodiments, a custodian includes cloud service providers.

The one or more custodians 830 then perform a two-hop (as previously described, any number of hops can be utilized) proxy re-encryption process. Additionally, the proxy re-encryption of each hop is one-way. That is, custodians 830 that have an $RK_{C1-C2}$ that atomically re-encrypts from $PK_{C1}$ to $PK_{C2}$ must not have the reverse permission of re-encrypting from $PK_{C2}$ to $PK_{C1}$, since this violates the privacy of the owner of $PK_{C1}$.

More specifically, the one or more custodians 830 proxy re-encrypt k from the first public key ($PK_{C1}$) to the second public key ($PK_{C2}$) using the first proxy re-encryption key ($RK_{C1-C2}$), wherein the first proxy re-encryption is one-way, and then, the one or more custodians proxy re-encrypt k from the second public key ($PK_{C2}$) to a public key ($PK_B$) of the second party B using the second proxy re-encryption key ($RK_{C2-B}$), wherein the second proxy re-encryption is one-way. Therefore, k is re-encrypted to B's public key ($PK_B$), denoted as $k^{PkB}$ in FIGS. 8, 9, and 10, without k ever being decrypted in between the steps in which the data passes through one or more custodians 830.

A valuable feature of the proxy re-encryption system and method is that the one or more custodians 830 are never able to decrypt k, nor the data d. Additionally, because the one or more curators 840 do not have the secret key $SK_B$ of the second party B, the one or more curators 840 are not able to obtain the block cipher key k to decrypt the data. Additionally, the one or more custodian 830 in conjunction with the one or more curators 840 are not able to decrypt the data d. Further, if party B were to collude with any of the custodians, they would not be able to recover party A's secret key $SK_A$ or any curator's secret key.

For an embodiment, the one or more curators 840 includes a plurality of curators, acting as one or more Policy Administration Points (PAP) and one or more Policy Decision Points (PDP) for one or more enterprises across trust boundaries. Further, the plurality of curators prevent the one or more custodians 830, acting as one or more Policy Enforcement Points (PEP), from accessing or tampering content of policies of the plurality of curators while enforcing the policies across the plurality of curators. For at least some embodiments, the policy enforcement actions performed by one or more custodians 830 are non-repudiable and tamper proof. At least some embodiments include the plurality of curators translating the policies into the generation of the first public key ($PK_{C1}$), the second public key ($PK_{C2}$), the first secret key ($SK_{C1}$), the second secret key ($SK_{C2}$). For at least some embodiments, there can be multiple public keys PKs and secret key SKs for each policy, and not every policy needs a proxy re-encryption key RK.

For at least some embodiment, publishing the first public key ($PK_{C1}$) and the second public key ($PK_{C2}$) includes the plurality of curators sending the first public key ($PK_{C1}$) and the second public key ($PK_{C2}$) to the one or more custodians. Further, at least some embodiments include the plurality of curators requesting for policy enforcement comprising publishing the first proxy re-encryption key ($RK_{c1-c2}$) and the second proxy re-encryption key ($RK_{c2-B}$) to one or more custodians, and sending requests to perform one or more proxy re-encryption operations to the one or more custodians. Further, at least some embodiments include the one or more custodians enforcing the policies by performing the proxy re-encrypting of k from the first public key ($PK_{C1}$) to the second public key ($PK_{C2}$) and proxy re-encrypting k from the second public key ($PK_{C2}$) to a public key ($PK_B$).

The second party B receives the encrypted data, and is able to obtain the block cipher key k, using the second party B's secret key $Sk_B$, and thus decrypt the data d, As shown, the first party A has access to a client connect agent (CCA) 812, and the second party B has access to a client connect agent (CCA) 814. An embodiment of CCA can be an independent software application program running in party A or B's computing device, such as desktop, laptop, mobile device, etc. Another embodiment of CCA is operable to run within a web browser.

The described embodiment provide systems, methods and apparatuses that address the twin requirements of (a) limiting cloud service providers' power to becoming just a full-fidelity policy enforcement point in the cloud, with plausible deniability of any policy or data access, and (b) designing its integration points with any organization and its business partners in a manner that enables low-impact integration and re-use of infrastructure, process, training, and personnel within the organization and its business partners.

In one embodiment, if the enterprise is leveraging PKI and X.509v3 certificates, the CCS can integrate with OCSP (Online Certificate Status Protocol) or it can obtain and parse CRLs (Certificate Revocation Lists) so that it comes to know when users are revoked, or have compromised their credentials, and it can immediately act by refusing to perform a proxy re-encryption operation. Therefore this trustworthy workflow is not just efficient, but also more secure because revocations can be near instantaneous. Furthermore, since all documents are only accessed after a proxy re-encryption is performed, the CCS can also serve as a fine-grain audit point that can generate logs of document access and enable the owning organization to have visibility into how documents are being shared, or modified and forwarded. Finally, the CCS is a higher-scale and federated (hence inter-operable) component of a Rights Management Solution, with the enhancement of being a complete lifecycle management solution that can manage end-to-end document retention, disposition, and hold across trust boundaries, whereas existing Rights Management solutions have stilted policies that are typically limited within one domain and do not scale. Because of this combination of visibility (through audit logs) and control (through end-to-end lifecycle management) the CCS is an enabler of organization GRC that includes Legal (monitoring, supervision, surveillance, litigation support) and Compliance (Confidentiality, Availability, Integrity, and other requirements.)

To implement the policy enforcement mechanism in the cloud through the CCS, the described embodiments include a primitive called a 'Mediation Rule', which is an atomic policy statement. It is implemented using a cryptographic technique called Proxy Re-Encryption, where the Mediation Rule is manifested as a Proxy Re-Encryption Key.

For at least some embodiments, any policy that includes Identity, Authorization, and Access Control, can be expressed in the form of Mediation Rule primitives, similar to a compilation target in a programming language. These Mediation Rules are created by off-cloud curators, or are automatically generated by adapters within the local organizational SCA, based on policies that are stored in IT infrastructures such as AD, ADFS or LDAP. The CCS has the restricted ability to only act upon a policy that is embodied through a Mediation Rule.

An example of a Mediation Rule for Authorization is a Proxy Re-encryption key from a group to an individual of that group, which can be referred to as Claims Groups, since they mirror Identity and Authorization Claims. The Claims Group demarcates the set of users that have the authorization to perform some operation (typically Create, Read, Update or Delete) on a set of objects that are delegated to that group. All these objects are encrypted to the public key of that group, and users are authorized to be part of that group through the presence of a Mediation Rule (a Proxy Re-Encryption key in the embodiments described) that will be in the possession of the CCS, so that it can enforce that policy to provide any user with access to those objects. For at least some embodiments, the CCS can only apply the Mediation Rule; it cannot create new Mediation Rules, and it cannot ignore or refuse to apply Mediation Rules without detection.

An example of a Mediation Rule for Access Control is a group that is used to stage documents that have a specific classification. For example "This HBI Group holds all documents that have High Business Impact". The associated Mediation Rule is a Proxy Re-encryption Key that translates any document that is encrypted to the public key of this group (that is termed a "Demand Group") to some claims group, such as Auditors. Suppose Bob is a member of the Auditors group, and Alice publishes a document to the HBI Group, an administrator would have generated a REK (Proxy Re-Encryption Key) from the HBI Group to the Auditors Group. Separately, that administrator (or possibly a different administrator) would have generated a REK from the Auditors Group to Bob's Public Key. If multiple administrators are involved, they can belong to one curator or multiple curators as described in at least some embodiments.

There are several significant advantages to this approach that include the fact that there is no group secret to cache and re-use, hence other than the group owner, no one else in the trustworthy workflow can define or control the policy of the group. Another benefit is that the REK is a business record that can be archived in a tamper proof manner using other cryptographic and other techniques so that it is easy to determine the existence of any policy (or the absence thereof) at any time, in order to support GRC requirements such as discovery.

For at least some embodiments, there can even be Mediation Rules for Identity, where an enhanced Identity Provider STS (Security Token Services) is able to authenticate a user only if it has a REK for that user. This illustrates how a single, atomic Mediation Rule can serve as a "compilation target" for complex enterprise Identity, Authorization, Access Control, and other policies. XACML is a blueprint and language for federation of policy, and in this blueprint the CCS is a Policy Enforcement Point (PEP) while the Policy Decision Points and Policy Authoring Points remain unchanged and within the trust boundaries of the respective organizations. The pivotal difference is that the PEPs of the described embodiments that are implemented through Mediation Rules cannot violate the Mediation Rules that are provided to them.

While some of the described embodiments may confine their exposition to typical enterprise policies that include Identity, Authorization and Access Enforcement, the Mediation Rule primitive is even more expressive and is able to provide the CCS with additional functionalities that might include contract mediation, fair exchange, and international trade. Since a Mediation Rule cannot provide the CCS with direct access to data, and since the CCS can be designed to record these Mediation Rules in a repository in a tamper resistant manner, these Mediation Rules are business records that can provide proof of the existence of a policy at a particular time. While there have been technologies that may have been amenable to constructing Mediation Rules in the literature in the last few years, there has been a lack of technologies that can facilitate non-interactive, one-way, collusion-resistant, delegation-resistant and multi-hop Mediation. Without one, or more of these features, this primitive would be unable to represent organizational policy with full fidelity, and any solution that is not complete (in that there is some room for human error or misbehavior) then that would risk the viability and headroom for that solution.

As shown, the trustworthy workflow is the new model of enabling security through carefully designed and implemented cryptography, federated key lifecycle management, federated policy, and federated reputation networks through cloud such that sensitive information (such as data, keys, and policies) is only accessible within a trust boundary while the encrypted data and keys can be stored by the custodians and the policies associated data management and access can be enforced by the custodians, across trust boundaries. The custodians are cryptographically prevented from accessing the data, the keys and the policies, and from releasing them to unauthorized entities.

Other Trustworthy Workflows

Figure 9:
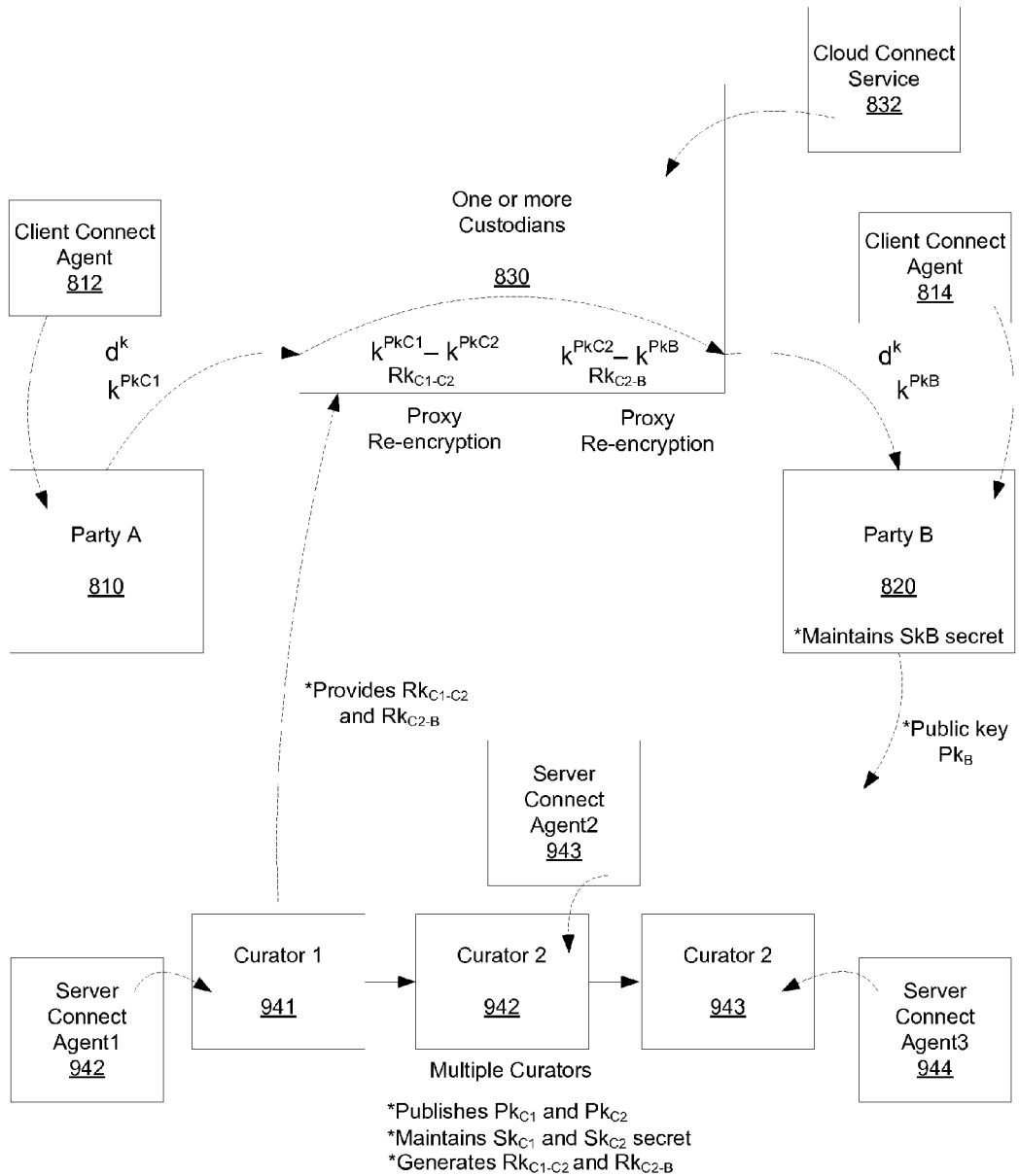
FIG. 9 shows another system that provides trustworthy workflow between a first party A and a second party B, according to an embodiment.

FIG. 9 shows another system that provides trustworthy workflows between a first party A and a second party B, according to an embodiment. FIG. 9 includes a plurality of curators 941, 942, 943. Each of the curators 941, 942, 943 has access to a SCA 942, 943, 944.

Multiple curators are sometimes necessarily for managing hierarchical organizations. For example, in a typical organization, there may be a top-level 'Company Full-time Employees' group, then a 'US Head Office' nested group, and in turn, an 'Engineering' nested group. Within the Engineering group there could be some user named 'Joe'. The translation from any parent group to contained group (one curator to another) is a hop, and the translation from the lowest contained group to the user, Joe, is the final hop (from Curator 3 943 to party B). Hence it can be quite useful to support multiple hops.

In yet another use case of multiple curators, party A could be a white-collar employee, AKA IW (or "Information Worker") in some organization. She has an organizational relationship with a Curator 1 that represents the authority within their own organization that is involved with classifying and safeguarding their own documents. Party B might be another IW within that same organization. It might also be an IW in a different organization, which has its own curator ('Curator 3'). Now Curator 3 is responsible for managing the organizational hierarchy (the groups, nesting of groups, memberships within groups, etc. . . . ), whereas Curator 1 is responsible for managing and classifying documents. Hence Curator 1 is in the world of what is referred to as "Demand Groups" (a Demand is the inverse of a Claim, and conveys what the requirements are for getting access to a document within that kind of group). Multi-hop Proxy Re-encryption across multiple curators become necessary to enforce policies across organization or trust boundaries.

Figure 10:
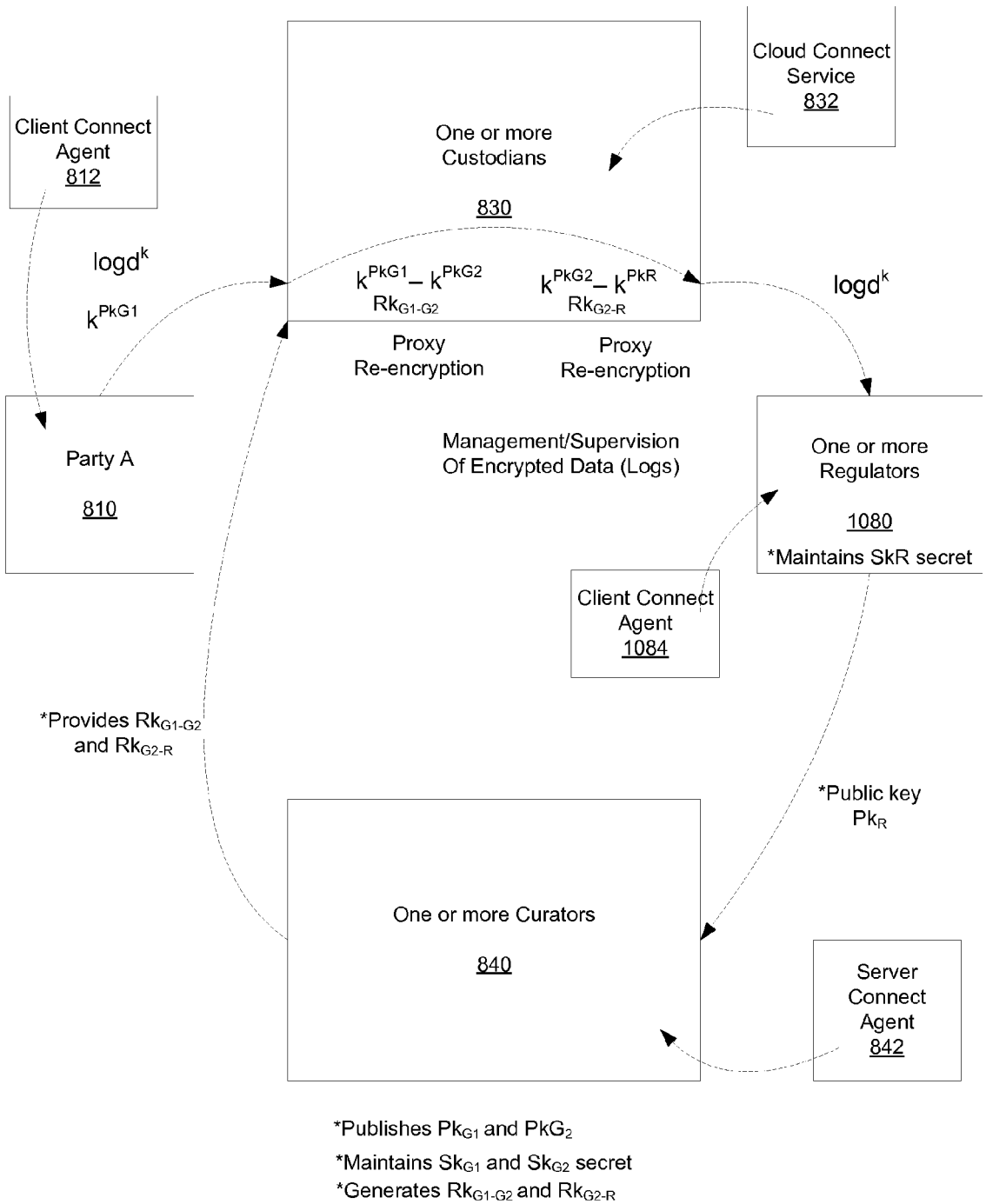
FIG. 10 shows a system that provides trustworthy workflow of log data from a first party A and a regulator, according to an embodiment.

FIG. 10 shows a system that provides trustworthy workflow of log data from a first party A and a regulator, according to an embodiment. While maintaining secure communication between the first party A and the second party B, at least some embodiments include one or more regulators (such as, regulator 1080) being able to monitor and supervising the activities of the first party A and the second party B. Accordingly, this embodiment includes log data (log d) being communicated from, for example, the first party A to the regulator 1080. As shown, the log data is encrypted to the key k (where k is, for example, a block cypher key), and k is encrypted to $P_{kG1}$. The regulator 1080 has access to a client connect agent 1084.

Generally, for an embodiment, the log data includes a listing of activities of an associated party or a curator and a description of data sent or received by the associated party or a curator. This embodiment is similar to the described embodiments. However, the date that is initially encrypted is "log data" rather than "data", and the regulator replaces the role of the second party B. The embodiment allows the regulator to regulate or monitor the log data of the first party A.

FIG. 11 is a flow chart that includes steps of a method of providing trustworthy workflow across trust boundaries between a first party A and a second party B. A first step 1110 includes one or more curators generating a first public key ($PK_{C1}$) and a second public key ($PK_{C2}$). A second step 1120 includes the one or more curators publishing the first public key ($PK_{C1}$) and the second public key ($PK_{C2}$). A third step 1130 includes the one or more curators generating a first proxy re-encryption key ($RK_{C1-C2}$) and a second proxy re-encryption key ($RK_{C2-B}$). A fourth step 1140 includes the first party A encrypting data having a key k, wherein k is encrypted according to the first public key ($PK_{C1}$). A fifth step 1150 includes one or more custodians proxy re-encrypting k from the first public key ($PK_{C1}$) to the second public key ($PK_{C2}$) using the first proxy re-encryption key ($RK_{C1-C2}$), wherein the proxy re-encryption is one-way. A sixth step 1160 includes the one or more custodians proxy re-encrypting k from the second public key ($PK_{C2}$) to a public key ($PK_B$) of the second party B using the second proxy re-encryption key ($RK_{C2-B}$), wherein the proxy re-encryption is one-way. A seventh step 1170 includes the second party B receiving the encrypted data and the encrypted k (now encrypted to $PK_B$) and obtaining the block cipher key k using a secret key $SK_B$, then subsequently decrypting data d.

As described, the method of providing trustworthy workflow across trust boundaries between a first party A and a second party B, includes multiple hops. That is, a first hop is provided by the one or more custodians proxy re-encrypting k from the first public key ($PK_{C1}$) to the second public key ($PK_{C2}$) using the first proxy re-encryption key ($RK_{C1-C2}$), and a second hop is provided by the one or more custodians proxy re-encrypting k from the second public key ($PK_{C2}$) to a public key ($PK_B$) of the second party B using the second proxy re-encryption key ($RK_{C2-B}$). Other embodiments can include more than two hops. For at least some embodiments, the proxy re-encryption being one-way includes the one or more curators generating the proxy re-encryption key utilizing a cryptographic one-way function. For a more specific embodiment, the cryptographic one-way function includes a cryptographic pairing, and wherein the proxy re-encryption is restricted to be one-way.

For at least some embodiments, the one or more curators includes a plurality of curators, wherein the plurality of curators act as one or more Policy Administration Points (PAP) and one or more Policy Decision Points (PDP) for one or more enterprises across trust boundaries, and further prevent the one or more custodians, acting as one or more Policy Enforcement Points (PEP), from accessing or tampering content of policies of the plurality of curators while enforcing the policies across the plurality of curators. For an embodiment, policy enforcement actions performed by one or more custodians are non-repudiable and tamper proof. For an embodiment, the plurality of curators translate the policies into the generation of the first public key ($PK_{C1}$), the second public key ($PK_{C2}$), the first secret key ($SK_{C1}$), the second secret key ($SK_{C2}$). For an embodiment, for each policy there are multiple public keys PKs and secret keys SKs, but every policy does not need to have a proxy re-encryption key RK. For an embodiment, publishing the first public key ($PK_{C1}$) and the second public key ($PK_{C2}$) includes the plurality of curators sending the first public key ($PK_{C1}$) and the second public key ($PK_{C2}$) to the one or more custodians. An embodiment further includes the plurality of curators requesting for policy enforcement, including publishing the first proxy re-encryption key ($RK_{c1-c2}$) and the second proxy re-encryption key ($RK_{c2-B}$) to the one or more custodians, and sending requests to perform one or more proxy re-encryption operations to the one or more custodians. An embodiment further includes the one or more custodians enforcing the policies by performing the proxy re-encrypting of k from the first public key ($PK_{C1}$) to the second public key ($PK_{C2}$) and proxy re-encrypting k from the second public key ($PK_{C2}$) to a public key ($PK_B$).

For an embodiment, the one or more curators include a single curator. For another embodiment, the one or more curators include a plurality of curators.

For an embodiment, the one or more custodians include a single custodian. For another embodiment, the one or more custodian comprises a plurality of custodian, and wherein a custodian can be instantiated by one public or private cloud provider. With multiple custodians, each custodian can be an organization or an individual that can enjoy a higher level of availability, performance, flexibility and mobility of a cloud network as well as price arbitrage.

For an embodiment, the one or more curators generate the second proxy re-encryption key ($RK_{C2-B}$) without knowledge of the secret key $SK_B$. Further, for an embodiment, this includes the one or more curators obtaining a public key of the second party B, and generating the second proxy re-encryption key ($RK_{C2-B}$) by applying a cryptographic function to the public key of the second party B.

For an embodiment, the one or more curators maintain a first secret key ($SK_{C1}$) and a second secret key ($SK_{C2}$). As described, for one embodiment a single curator maintains the first secret key and the second secret key ($SK_{C2}$). For another embodiment, a first curator maintains the first secret key and a second curator maintains the second secret key ($SK_{C2}$).

An embodiment further includes preventing collusion between the custodian and the second party B. Specifically, the custodian and the second party cannot collude to recover the secret key of the group owner (first party, or first party A) because the algorithm implements a one-way pairing function that makes it computationally infeasible for the custodian and the second party to work backward and recover that secret, the first party A's secret key, nor any curator's secrete key.

For at least one embodiment, the custodian includes an enterprise and the curator provides the trustworthy workflow within a cloud network. For an embodiment, Party A is a resource provider in an enterprise and the curator is an identity provider.

An embodiment further includes one or more regulators receiving logs from at least one of the first party A and the second party B. An embodiment further includes one or more curators generating a third public key ($PK_{G1}$) and a fourth public key ($PK_{G2}$), publishing the third public key ($PK_{G1}$) and the fourth public key ($PK_{G2}$), and generating a third proxy re-encryption key ($RK_{G1-G2}$) and a fourth proxy re-encryption key ($RK_{G2-R}$). Further, the first party A or the second party B encrypts log data having a key k1, wherein k1 is encrypted according to the third public key ($PK_{G1}$). One or more custodians proxy re-encrypt k1 from the third public key ($PK_{G1}$) to the fourth public key ($PK_{G2}$) using the third proxy re-encryption key ($RK_{G1-G2}$), wherein the proxy re-encryption is one-way, and the one or more custodians proxy re-encrypt k1 from the fourth public key ($PK_{C2}$) to a public key ($PK_R$) of a regulator party R using the fourth proxy re-encryption key ($RK_{G2-R}$). Finally, the regulator party R receives the log data and decrypts with a secret key $SK_R$.

For an embodiment, the party B is the curator.

For at least some embodiments, proxy re-encryption keys are generated by the one or more curators have a time-out period in which the proxy re-encryption keys expire.

For at least some embodiments, at least one of party A and party B are within a hierarchical group, and further comprising proxy re-encrypting the k more than twice, wherein each translation of the data from one party of the hierarchical group to another party of the hierarchical group includes a proxy re-encrypting.

Figure 12:
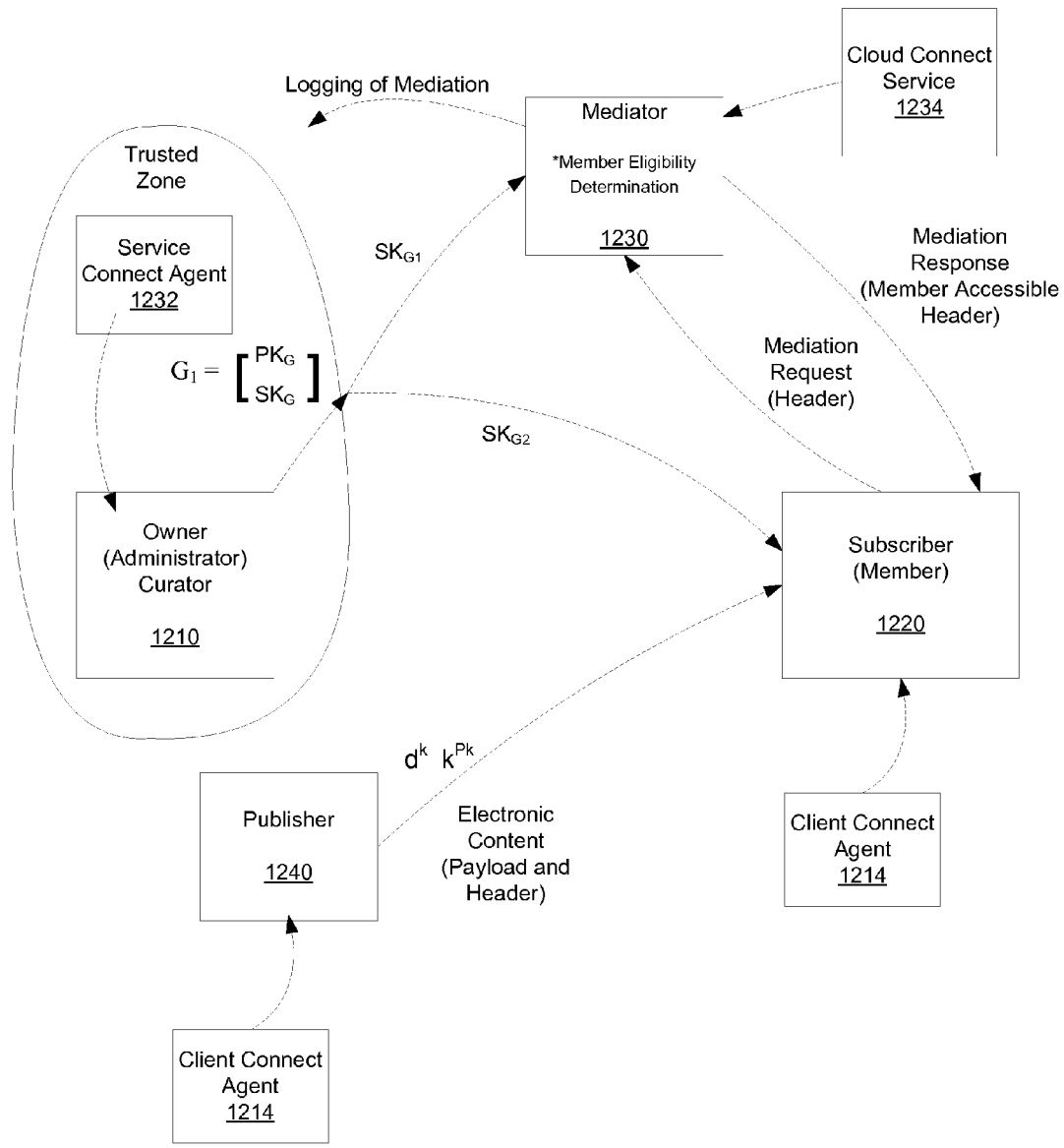
FIG. 12 shows a system that provides for monitoring and control of access to an electronic content, according to an embodiment.

FIG. 12 shows a system that provides for monitoring and control of access to an electronic content, according to an embodiment. As shown, the system includes an owner 1210, a member 1220, and a mediator 1230. An embodiment includes the formation of a group, wherein the group allows for the sharing and collaboration of a document, or more generally, electronic content. The group is formed by the owner 1210. For an embodiment, formation of the group includes the owner 1210 publishing a group public key $PK_G$, and generating and maintaining a group secret key $SK_G$ as a secret. The owner can store the group secret key $SK_G$, for example, in its own data center.

Further, the member 1220 and the mediator 1230 each publish their own public keys, and maintain corresponding secret keys as a secret. The member 1220 and the mediator 1230 can each secure their secret key by protecting the secret key through encryption before storing or transmitting the secret key to a custodian. That key encryption key can be derived from a pass phrase that only the principal (originator of the secret key) knows.

Once the group has been formed, the owner 1210 adds members (such as member 1220) by generating a first share $SK_{G1}$ from the group secret key $SK_G$ and a public key of a member, and a second share $SK_{G2}$ from the group secret key $SK_G$ and a public key of a mediator. The owner 1210 adds the member to the group by obtaining the member's public key from the mediator (or some other public source).

Once the group has been formed and the owner 1210 has published the group public key $PK_G$, a publisher 1240 can encrypt a document (more generally, electronic content) using the group public key $PK_G$. For an embodiment, the user retrieves the group public key $PK_G$ from a custodian (owner 1210), wherein the custodian is operating in the directory role. For an embodiment, the document is encrypted according to a key K, and the key K is encrypted according to the group public key $PK_G$. For an embodiment, the document includes a payload and a header.

The member 1220 can obtain the encrypted document in various ways. The publisher 1240 may send the encrypted document to the member 1220, the member 1220 may retrieve the encrypted document, or there may be an intermediary, such as, Drop Box® between the publisher 1240 and the member 1220.

The member 1220 receives the document, but cannot directly decrypt the document because the member 1220 does not have access to the group secret key $SK_G$. However, at least some embodiments allow the member 1220 to decrypt the document through the aid of the mediator 1230. More specifically, for an embodiment, the member 1220 request mediation by the mediator 1230 by submitting the header of the document to the mediator 1230. If the electronic content is small, the header may actually be the payload of the electronic content. More typically, the payload is large, and the header only includes a cryptographic secret that can be used to unlock the payload.

In another embodiment, a user server publishes the actual payload to a location that is resilient against inappropriate access or modification, or because the payload is too voluminous for transmission in the data path, and publishing a capability for gaining access in lieu of the payload, and the member server consequently requiring mediation in order to access that capability for gaining access to the payload.

In certain situations where there is a pre-defined data path, such as document sharing through a solution such as Dropbox®, the encrypted document, and the associated metadata is best packaged as a single unit that travels together. The original document that is encrypted is termed the 'payload', and the header contains the cryptographic material and any associated document classifications and/or access policies.

In other situations where the digital content is too unwieldy to share through a solution such as Dropbox®, either due to the size, or to the streaming nature of access, it may be better to replace the payload with an address. In this situation, the header contains a capability that constitutes both a location that is otherwise difficult to guess, along with the cryptographic material for an authorized party to perform cryptographic operations such as verification and decryption. In this case there might be other benefits, such as tamper prevention, since lack of access to that capability would typically preclude accidental or malicious defacement or deletion, where defacement renders that original content inaccessible.

In other situations the payload itself might be very small, perhaps representing an offer or a bid in a marketplace scenario, or some other secret that needs to be securely stored or shared. In this case it might be optimal to embed this secret directly within the header. After a successful mediation operation, the secret becomes directly accessible to the authorized recipient (such as, member 1220) without the subsequent need to unlock any payload.

Once the mediator 1230 receives the request for mediation from the member 1220, the mediator 1230 checks to confirm that the member 1220 is eligible for decryption of the document. The eligibility of the member 1220 can be determined in one or more ways.

One mechanism for determining member eligibility is for the mediator 1230 to maintain a white list, or a black list of eligible members. Typically the owner 1210, or the delegate or auditor updates this list. In this case the member 1220 is eligible if they are on the white list, or if they are not on the black list, or both.

Another mechanism for determining member eligibility is for the mediator 1230 to maintain a matrix of authorization, where one dimension of the matrix is the document classification, while the other dimension is the access requirements. The first might be transferred securely (and privately in some cases) from the publisher 1240, to the mediator 1230 through the header. The second might specify individuals (through a white or black list), or it might specify specific roles that a requestor needs to be member of, which is sometimes described as RBAC, or Role Based Access Control. The second might also specify a claim that the member 1220 needs to provide to prove they have legitimate access to that document. This might be either an ancillary mechanism that is used in addition to group membership usually signs this claim, or it might be in lieu of group membership (where any member with the right claim will have access to that document). Some authority that the Mediator knows of can issue such a claim.

There are other mechanisms for the mediator 1230 to determine eligibility of a member 1220, which involve integration with existing enterprise and federation infrastructures. For example, in a policy-based network, the mediator 1230 may serve as an enforcement point (or Policy Enforcement Point) that needs to check with one or more Policy Decision Points before it executes the mediation.

For an embodiment, the mediator 1230 logs the requests by the member, eligibility determinations, and mediator responses. For an embodiment, the logging includes the mediator 1230 storing the requests by the member, eligibility determinations, and mediator responses. Each of these can be logged at a server, wherein the server is accessible by the owner and others. For an embodiment, the logging includes the mediator dispatching alerts of the requests by the member, eligibility determinations, and mediator responses to the owner and others.

Due to the trustworthy nature of the hub, it is an enabler of fine-grain lifecycle management of electronic content, perhaps in cases where it might be a business record, and this facilitates the enforcement of retention, disposition, hold, and other events of data that is owned by an individual or organization, but is outside their region of control.

Based on the configuration, the hub may either log access requests (either ones that failed due to lack of eligibility, or both). These logs may be made available to just the parties authorized by the group owner, or their delegate or auditor. In other cases the logs may be delivered in the form of alerts to the group owner, or their delegate or auditor, in cases where there is a need for rapid notification.

If the mediator 1230 determines that the member 1220 is eligible, the mediator 1230 responds to the request for mediation with a member accessible header, wherein the member accessible header includes the header after application of $SK_{G2}$.

Typically the logs and alerts from the hub are integrated with enterprise infrastructure that might range from Sys log d, to specialized monitoring and discovery solutions, or possibly to high-scale log processing systems that might post-process these logs for purposes that might include filtering, classification, pattern or anomaly detection. In many cases, a cloud or similar network can provide an end-to-end service that would significantly reduce any individual or organization's capital and operational expenses.

For an embodiment, the member 1220 obtains a secret based on $SK_{G1}$ and the member accessible header. Further, the member 1220 decrypts the payload of the electronic content using the secret. Through the controlled document (electronic content) access of the described embodiments, the member 1220 is able to decrypt the document only through the participation and control of the mediator, and the owner 1210.

As shown, the mediator 1230 is at least partially controlled by a cloud connect service (CCS) 1234, the member 1220 and the publisher 1240 are at least partially controlled by a client connect agent (CCA) 1214, and the owner 1210 is at least partially controlled by a service connect agent (SCA) 1232. The owner 1210 operates within a trusted zone and the mediator operates within a partially trusted zone.

In some embodiments the CCS 1234 centralizes roles that include Directory, Key Store, Mediator, Log Storage and Delivery, and others. In other embodiments a separate party that includes the owner operator or their organization or delegate hosts the Mediator.

It is to be understood that the roles of each of the parties (owner 1210, member 1220, mediator 1230, publisher 1240) can be changed, and/or the parties can play multiple roles. That is, for example, the member 1220 can additionally play the role of owner. In some embodiments the group owner 1210 represents more than one individual, whereby access to the group secret key itself is mediated in a similar operation.

FIG. 12 provides trustworthy workflow between a publisher 1240 and a member 1220 of a group formed by an owner 1210. For an embodiment, the owner 1210 includes a custodian. For an embodiment, the mediator 1230 includes a curator. Each of the owner 1210, the member 1220, the mediator 1230 and the publisher 1240 include servers, wherein each server includes at least one or more processors and memory. Further, the one or more servers of the owner 1210, the member 1220, the mediator 1230 and the publisher 1240 are electronically connected through a computer network.

Figure 13:
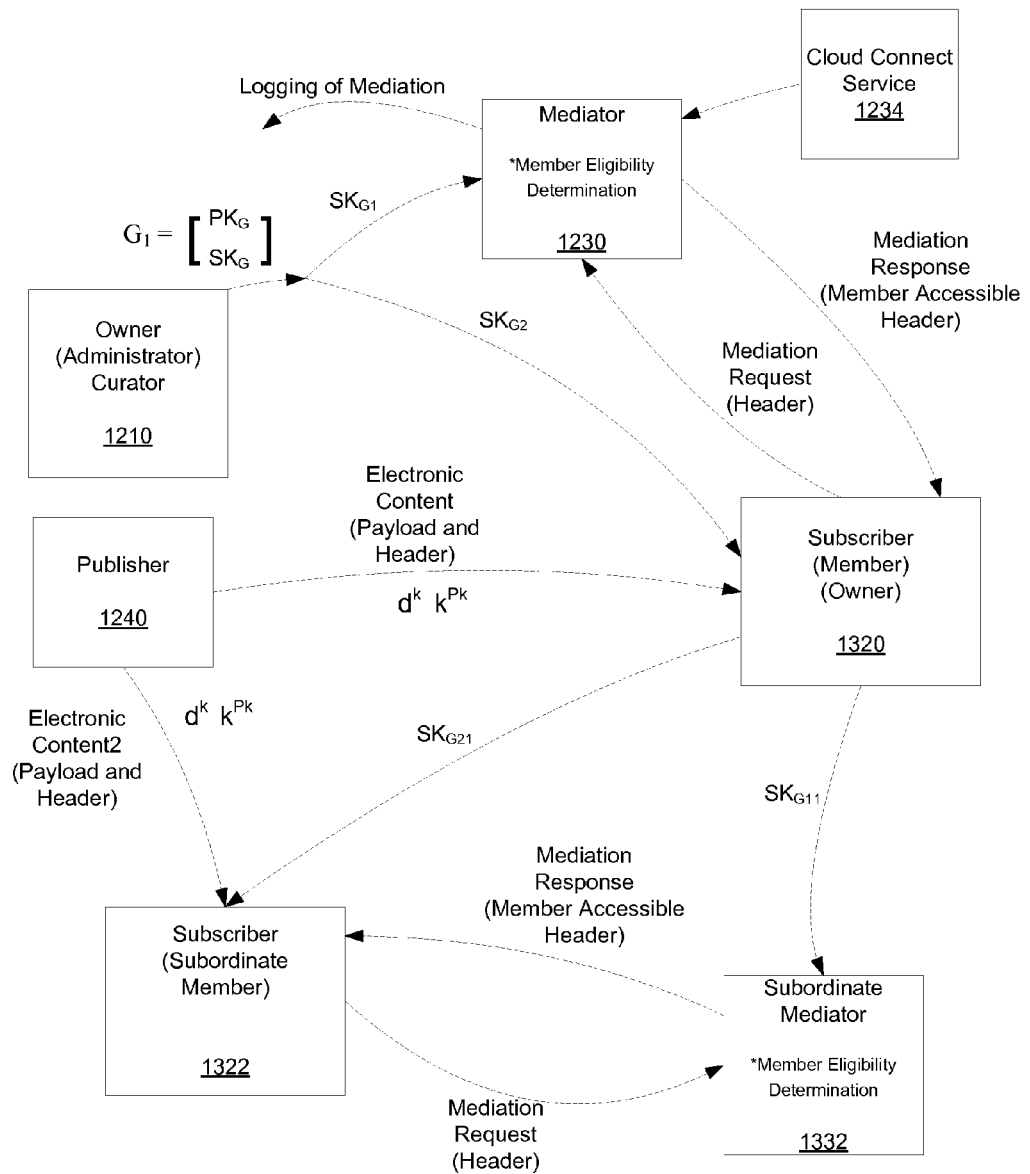
FIG. 13 shows another system that provides for monitoring and control of access to an electronic content, according to an embodiment.

FIG. 13 shows another system that provides for monitoring and control of access to an electronic content, according to an embodiment. FIG. 13 shows that for an embodiment, the member 1320 can also play the role of an owner, and create a subordinate group that includes a subordinate member 1322. As previously described, each of the parties of the system can be multiple roles.

Similar to the group formation previously described, the owner 1320 (also playing the role of member as previously described) publishes a group public key $PK_{G2}$, and generating and maintaining a group secret key $SK_{G2}$ as a secret. The owner can store the group secret key $SK_{G2}$, for example, in its own data center.

The subordinate member 1322 and a subordinate mediator 1332 each publish their own public keys, and maintain corresponding secret keys as a secret. The subordinate member 1322 and the subordinate mediator 1332 can each secure their secret key by protecting the secret key through encryption before storing or transmitting the secret key to a custodian. That key encryption key can be derived from a pass phrase that only the principal (originator of the secret key) knows.

Once the group has been formed, the owner 1320 adds members (such as sub-ordinate member 1322) by generating a first share $SK_{G21}$ from the group secret key $SK_{G2}$ and a public key of the sub-ordinate member 1322, and a second share $SK_{G2}$ from the group secret key $SK_{G2}$ and a public key of a sub-ordinate mediator 1332. The owner 1320 adds the sub-ordinate member to the group by obtaining the sub-ordinate member's public from the sub-ordinate mediator 1332 (or some other public source).

Once the group has been formed and the owner 1320 has published the group public key $PK_{G21}$, the publisher 1240 (note that this can be an entirely different publisher than previously described) can encrypt a document (more generally, electronic content) using the group public key $PK_{G21}$. For an embodiment, the sub-ordinate user 1322 retrieves the group public key $PK_{G2}$ from the owner 1320, wherein the owner 1320 is operating in the directory role. For an embodiment, the document is encrypted according to a key K, and the key K is encrypted according to the group public key $P_{KG21}$. For an embodiment, the document includes a payload and a header.

The subordinate member 1322 can obtain the encrypted document in various ways. The publisher 1240 may send the encrypted document to the subordinate member 1322, the subordinate member 1322 may retrieve the encrypted document, or there may be an intermediary, such as, drop box between the publisher 1240 and the subordinate member 1322.

The subordinate sub-ordinate member 1322 receives the document, but cannot directly decrypt the document because the sub-ordinate member 1322 does not have access to the group secret key $SK_{G21}$. However, at least some embodiments allow the sub-ordinate member 1322 to decrypt the document through the aid of the sub-ordinate mediator 1332. More specifically, for an embodiment, the sub-ordinate member 1322 request mediation by the sub-ordinate mediator 1332 by submitting the header of the document to the sub-ordinate mediator 1332. If the electronic content is small, the header may actually be the payload of the electronic content. More typically, the payload is large, and the header only includes a cryptographic secret that can be used to unlock the payload.

Once the sub-ordinate mediator 1332 receives the request for mediation from the sub-ordinate member 1322, the sub-ordinate mediator 1332 checks to confirm that the sub-ordinate member 1322 is eligible for decryption of the document. The eligibility of the sub-ordinate member 1322 can be determined in one more ways.

For an embodiment, the sub-ordinate mediator 1332 logs the requests by the member, eligibility determinations, and mediator responses. For an embodiment, the logging includes the sub-ordinate mediator 1332 storing the requests by the member, eligibility determinations, and mediator responses. Each of these can be logged at a server, wherein the server is accessible by the owner and others. For an embodiment, the logging includes the mediator dispatching alerts of the requests by the member, eligibility determinations, and mediator responses to the owner and others.

If the sub-ordinate mediator 1332 determines that the sub-ordinate member 1322 is eligible, the sub-ordinate mediator 1332 responds to the request for mediation with a member accessible header, wherein the member accessible header includes the header after application of $SK_{G21}$'.

For an embodiment, the sub-ordinate member 1322 obtains a secret based on $SK_{G11}$ and the member accessible header. Further, the sub-ordinate member 1322 decrypts the payload of the electronic content using the secret. Through the controlled document (electronic content) access of the described embodiments, the sub-ordinate member 1322 is able to decrypt the document only through the participation and control of the mediator, and the owner 1320.

Figure 14:
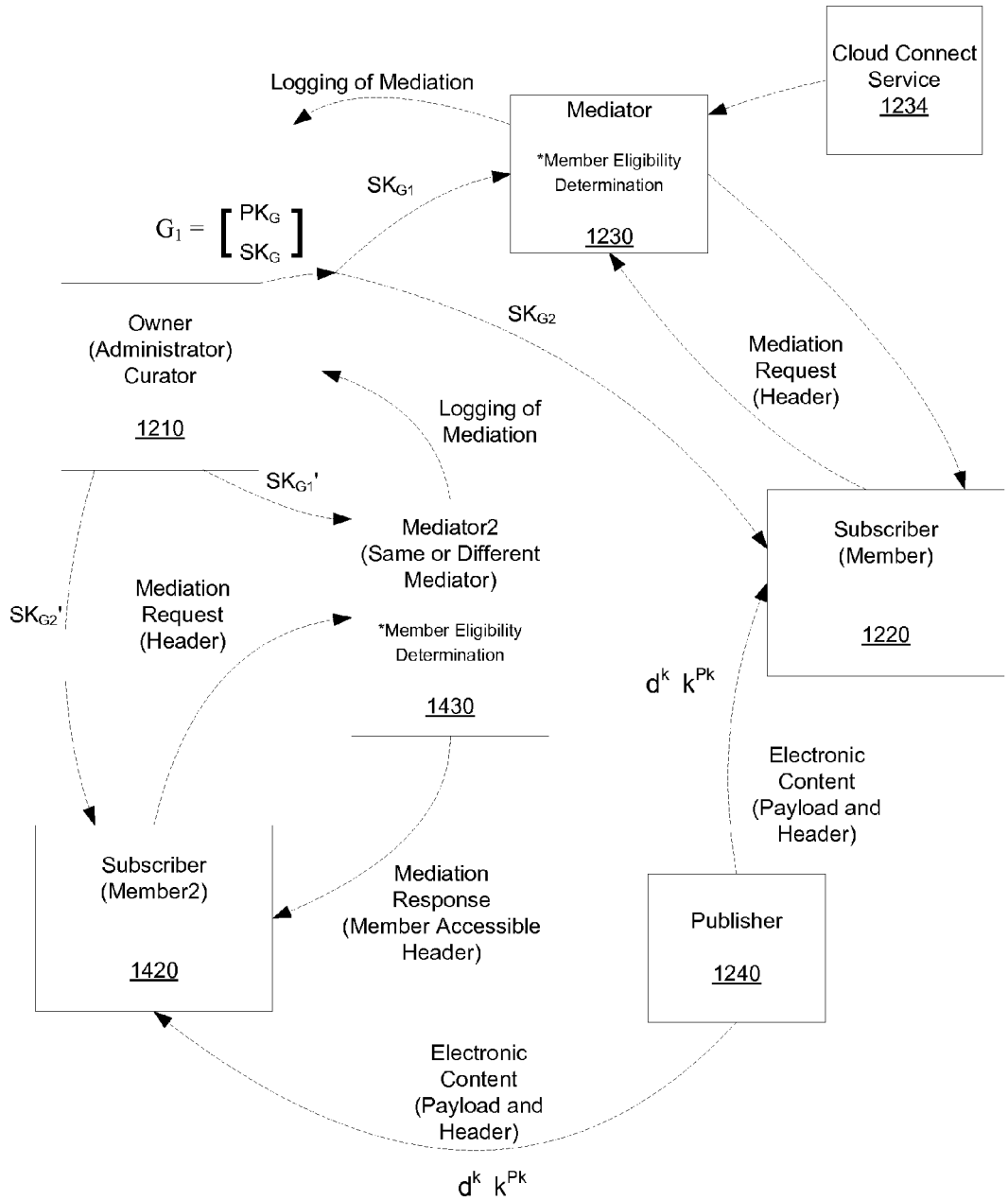
FIG. 14 shows another system that provides for monitoring and control of access to an electronic content, according to an embodiment.

FIG. 14 shows another system that provides for monitoring and control of access to an electronic content, according to an embodiment. This embodiment includes the addition of a second member 1420. Similar to the embodiments previously described, the owner 1210 can add the second member 1420 by generating a first share $SK_{G1}$' from the group secret key $SK_G$ and a public key of the second member, and a second share $SK_{G2}$' from the group secret key $SK_G$ and the public key of the mediator (here, a second mediator 1430 is shown, but the mediator can alternatively be the prior mediator 1230). Further, the owner 1210 provides the first share $SK_{G1}$' to the second member 1420 and the second share $SK_{G2}$' to the mediator 1430, wherein the second share $SK_{G2}$ is different than the second share $SK_{G2}$'.

For at least some embodiments, there are multiple mediators for either business reasons, such as separation of responsibilities, or for compliance reasons where certain categories of mediation are performed by a compliant entity, or for federal or government reasons where some of the mediation is deemed to be more sensitive. In addition to partitioning of mediators in this manner, it might be desired to have a level of redundancy and scale by duplicating the functionality of a mediator across multiple instances.

Figure 15:
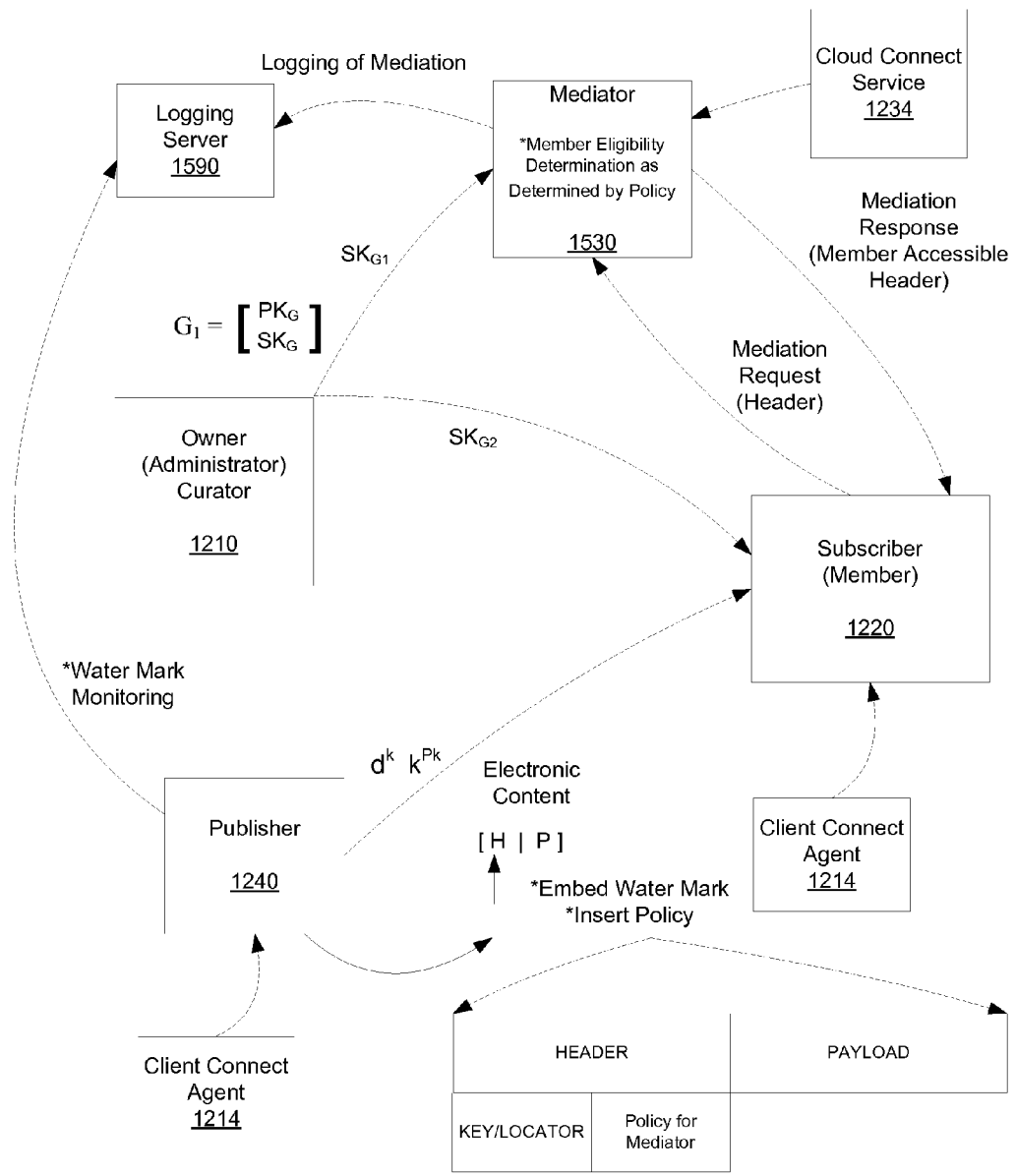
FIG. 15 shows another system that provides for monitoring and control of access to an electronic content, according to an embodiment.

FIG. 15 shows another system that provides for monitoring and control of access to an electronic content, according to an embodiment. This embodiment includes water mark and policy controls of the publisher. As previously described, the publisher 1240 provides a document (more generally, electronic content) to the member 1220 that includes a header and a payload. As previously described, for an embodiment, if the electronic content is small, the header may actually be the payload of the electronic content. For another embodiment, the payload is large, and the header only includes a cryptographic secret that can be used to unlock the payload. For an embodiment, the payload includes a pointer to where the electronic content is located (stored). Again, the header may include a cryptographic secret that can be used to unlock the payload (pointer).

The publish 1240 can maintain some control by embedding, for example, an opaque watermark in the header, and logging (at, for example, a logging server 1590), by a mediator 1530, the header when received by the mediator 1530 from the member, 1220 thereby allowing the publisher 1240 to track the electronic content. For at least some embodiments, the watermark is selectively translucent to other parties, perhaps log processing services, that might be able to detect patterns and anomalies, but in a manner that minimizes compromise of sensitive content. As shown in FIG. 15, the header may include a key/locator that is necessary for the intended recipient to obtain access to the sensitive payload. For at least some embodiments, the received document is a composite of a header and a payload, and the secret is the decryption key that is made available subsequent to mediation. In addition, for at least some embodiments, the secret might be augmented with a verification key for ensuring that the payload has not been tampered with in transit or storage. In cases where this payload is absent, perhaps for reasons of efficiency or enhanced security, the secret might also consist of a locator, such as a Uniform Resource Identifier, along with a decryption key. The intended recipient only knows of the real location of the payload that is a candidate for decryption after a successful mediation.

Another embodiment includes the publisher 1240 inserting, an electronic content specific policy in the header (as shown in FIG. 15 as a policy for mediator 1530), wherein only the mediator 1530 can decrypt the policy, and wherein the electronic content specific policy provides additional instructions regarding eligibility of the member. For an embodiment, the policy directs the mediator to request mediation from a higher mediator authority. In at least some embodiments, the policy is not visible to the members, but is made available to the mediator 1530. In other embodiments, the policy that is visible to the mediator 1530 consists of subsequent instructions, such as the need to consult with a policy decision point, where those instructions to that policy decision point may not necessarily be visible to the mediator 1530.

For an embodiment, the header optionally contains visible information for intermediaries to perform cryptographic operations that might include checking for integrity of the encrypted payload, or establishing non-repudiation or data provenance. For an embodiment, the member accessible header optionally contains information for performing cryptographic operations that might include checking for integrity of the encrypted or decrypted payload, or establishing non-repudiation or data provenance.

Figure 16:
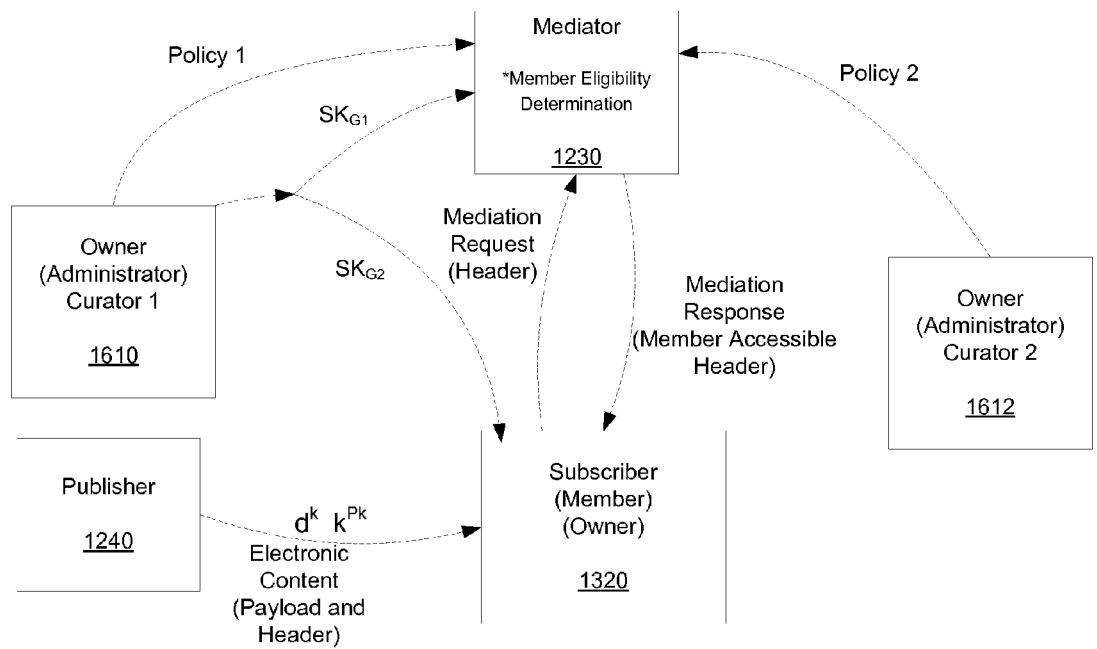
FIG. 16 shows another system that provides for monitoring and control of access to an electronic content, according to an embodiment.

FIG. 16 shows another system that provides for monitoring and control of access to an electronic content, according to an embodiment. This embodiment includes a first owner 1610 and a second owner 1612. As shown, the first owner 1610 provides a first policy and the second owner 1612 provides a second policy. This embodiment provides for extension to multiple owners (curators) and provides federation of the curators, wherein each owner (curator) is responsible for their own sets of content. While two owners are shown, the described embodiments are not limited to two owners.

Typically in a scenario that involves collaboration or commerce, there are diverse, perhaps mutually distrustful participants that need to manage their own access policies that might include management of white or black lists, and perhaps ratings of buyers, sellers or other participants. These scenarios are "federated" and can consist of more than one owners might either have exclusive control over their respective sets of documents that they are the resource providers of, or it may be the case that they may have to co-operate through some policy to be able to update or modify the mediation policy.

Figure 17:
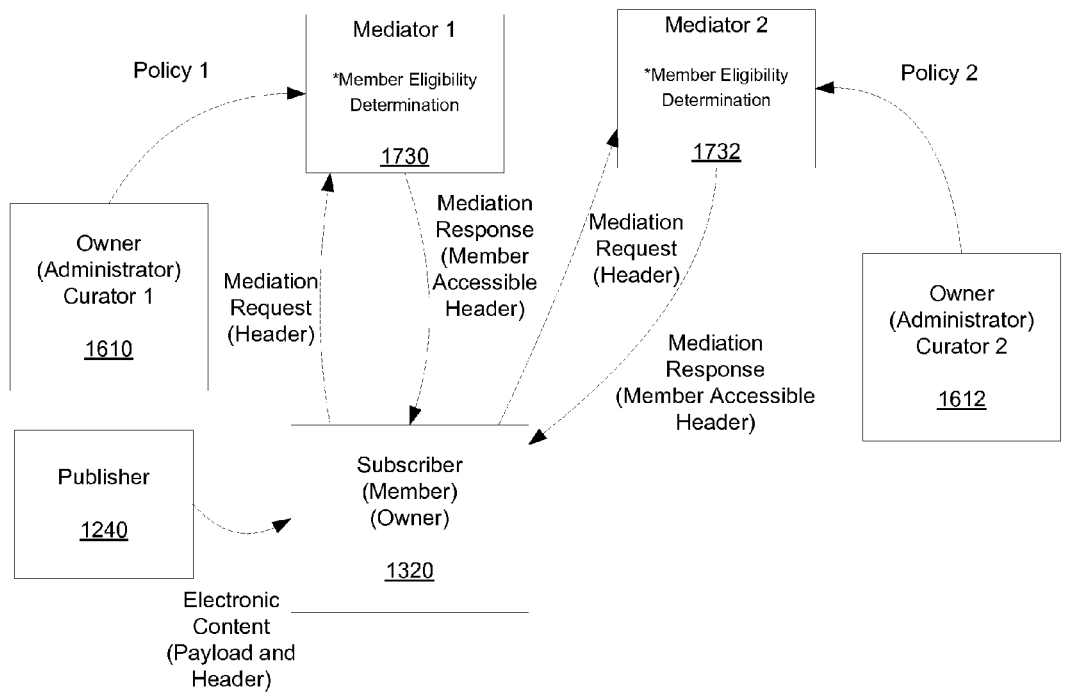
FIG. 17 shows another system that provides for monitoring and control of access to an electronic content, according to an embodiment.

FIG. 17 shows another system that provides for monitoring and control of access to an electronic content, according to an embodiment. This embodiment includes a first mediator 1730 and a second mediator 1732. For mediation, each of the mediators 1730, 1732 weigh in. While two mediators are shown, the described embodiments are not limited to two mediators.

The described embodiments enable the high-scale enablement of existing networks such as International Trade, where multiple mediators, as described below, might represent the banks that represent buyers and sellers, and the eligibility for access to electronic goods, or to the payment, is gated by the need for a successful mediation by the appropriate mediator, which is likely to have up-to-date information about the transaction in question.

There are other federation scenarios where the participants may not be willing or able to agree upon a single mediator. This might be for global commerce, where the physical location of a mediator might make it subject to disruption or coercion by local powers. In such a situation, at least some embodiment include more than one mediator that is isolated within distinct physical or electronic boundaries that limits physical or electronic access, and the successful mediation requires all mediators to execute a mediation operation. It is possible to have more expressive circuits, such as thresholds, where perhaps a specified majority of mediators needs to execute their part in the mediation, before the intended recipient gets access to the payload.

Figure 18:
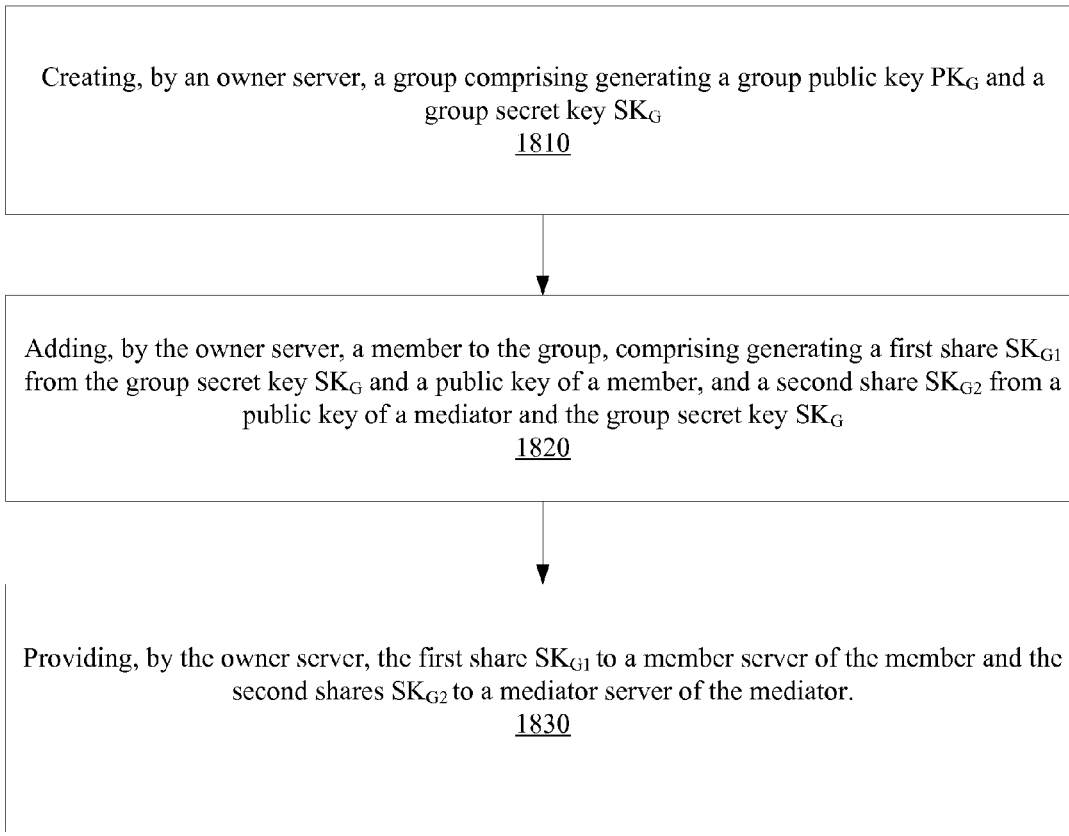
FIG. 18 is a flow chart that includes steps of a method for monitoring and control of access to an electronic content, according to an embodiment.

FIG. 18 is a flow chart that includes steps of a method for monitoring and control of access to an electronic content, according to an embodiment. A first step 1810 includes creating, by an owner server, a group comprising generating a group public key $PK_G$ and a group secret key $SK_G$. A second step 1820 includes adding, by the owner server, a member to the group, comprising generating a first share $SK_{G1}$ from the group secret key $SK_G$ and a public key of a member, and a second share $SK_{G2}$ from the group secret key $SK_G$ and a public key of a mediator. A third step 1830 includes providing, by the owner server, the first share $SK_{G1}$ to a member server of the member and the second shares $SK_{G2}$ to a mediator server of the mediator.

FIG. 19 is a flow chart that includes additional steps of a method for monitoring and control of access to an electronic content, according to an embodiment. A first step 1940 includes a user publishing an electronic content for the group, comprising the user encrypting the electronic content to the group public key $PK_G$, wherein the electronic content includes a header and a payload. A second step 1950 includes obtaining, by the member, the encrypted electronic content. A third step 1960 includes requesting, by the member, mediation by the mediator, comprising the member dispatching the header of the encrypted electronic content to the mediator. A fourth step 1970 includes determining, by the mediator, whether the member is eligible to decrypt the electronic content, if eligible, the mediator responding to the request for mediation with a member accessible header, wherein the member accessible header includes the header after application of $SK_{G2}$. A fifth step 1980 includes obtaining, by the member, a secret based on $SK_{G1}$ and the member accessible header. A sixth step 1990 includes decrypting, by the member, the payload of the electronic content using the secret.

As previously described, an embodiment includes the mediator logging requests by the member, eligibility determinations, and mediator responses. Specifically, for an embodiment, the logging includes the mediator storing the requests by the member, eligibility determinations, and mediator responses at a server, wherein the server is accessible by the owner and others. For another embodiment, the logging includes the mediator dispatching alerts of the requests by the member, eligibility determinations, and mediator responses to the owner and others.

As previously described, for an embodiment determining whether the member is eligible includes the mediator being notified by the owner prior to the mediation request. For another embodiment determining whether the member is eligible comprises the mediator being notified by the owner or another authority prior to the mediation request that the member's public key in invalid.

As previously described, for an embodiment, if the payload is greater than a threshold in size, the header includes a secret needed to decrypt the payload. If the payload is less than the threshold in size, the header is the payload.

As previously described, an embodiment further includes the member acting in an owner capacity, and creating a subordinate group. For an embodiment, this includes creating, by the member, a subordinate group comprising generating a subordinate group public key $PK_G$ and a subordinate group secret key $SK_G$, adding, by the member, a subordinate member to the subordinate group, including generating a first share $SK_{G11}$ from the subordinate group secret key $SK_G$ and a public key of a subordinate member, and a second share $SK_{G21}$ from the subordinate group secret key $SK_G$ and a public key of a subordinate mediator, and providing the member the first share $SK_{G11}$ to a subordinate member server of the subordinate member and the second shares $SK_{G21}$ to a subordinate mediator server of the subordinate mediator.

As previously described, an embodiment includes adding, by the owner server, a second member to the group, comprising generating a first share $SK2_{G1}$ from the group secret key $SK_G$ and a public key of the second member, and a second share $SK_{G2}'$ from the group secret key $SK_G$ and the public key of the mediator, and providing, by the owner server, the first share $SK_{G1}'$ to a second member server of the second member and the second share $SK_{G2}'$ to the mediator server of the mediator, wherein the second share $SK_{G2}$ is different than the second share $SK_{G2}'$.

As previously described, an embodiment further includes embedding, by the publisher, an opaque watermark in the header, and logging, by the mediator, the header when received by the mediator from the member, thereby allowing the publisher to track the electronic content.

As previously described, an embodiment further includes inserting, by the publisher, an electronic content specific policy in the header, wherein only the mediator can decrypt the policy, and wherein the electronic content specific policy provides additional instructions regarding eligibility of the member. For an embodiment, the policy directs the mediator to request mediation from a higher mediator authority.

Figure 20:
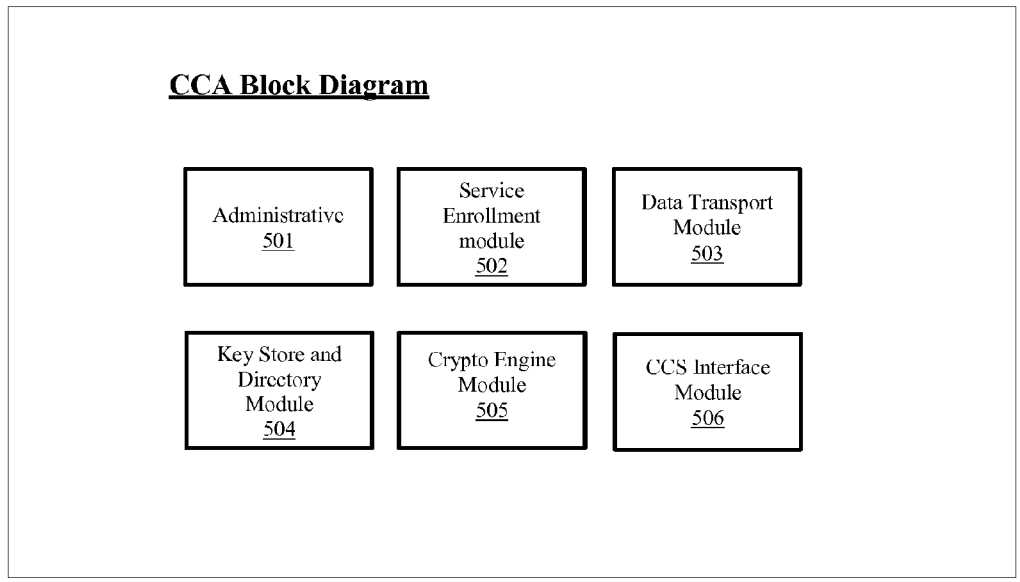
FIG. 20 shows a client connect agent according to an embodiment.

FIG. 20 shows an embodiment of the client connect agent (CCA) according to an embodiment. As previously described and shown in FIGS. 12, 13, 14 and 15, the member 1220 and the publisher 1240 have access to the client connect agent (CCA) 1214. As described, an embodiment of CCA can be an independent software application program running in the member 1220 or the publisher's 1240 computing device, such as desktop, laptop, mobile device, etc. Another embodiment of CCA is operable to run within a web browser.

As shown, this embodiment includes at least the following modules an Administrative Module 501, a Service Enrollment Module 502, a Data Transport Module 503, a Key Store and Directory Module 504, a Crypto Engine Module 505, and a CCS Interface Module 506.

For an embodiment, the Administrative Module 501 performs various configuration and administrative tasks to configure the local CCA, to manage users and groups within the CCA control, to interface with human users through a command line interface (CLI) or a UI interface (UI), to interface with other programs through an application programming interface (API), to update CCA software from the connected CCS, and to send event logs to CCS via CCS Interface Module 506.

For an embodiment, the Service Enrollment Module 502 performs enrollment tasks with a realm that is represented by one or more curators. The Service Enrollment Module 502 also manages the password and the login process with the connected CCS, among others.

For an embodiment, the Data Transport Module 503 is responsible for data upload and download. The data can be uploaded from the compute device where the CCA operates and to any data repository in the cloud through any data transfer protocol such as email, HTTP, FTP, etc. or physical data storage media such as floppy disc, CD ROM, DVD ROM, USB Drive, etc., and vice versa.

For an embodiment, the Key Store and Directory Module 504 stores local user's secrets (such as the private/secret keys,) that are encrypted and copies of various certificates that can be used for local CCA cache access and offline operations.

For an embodiment, the Crypto Engine Module 505 performs various encryption/decryption, signing, and key generation functions.

For an embodiment, the CCS Interface Module 506 performs secure communications with CCS. For at least some embodiments, the CCS Interface Module 506 includes a RESTful interface Adapter—CRUD calls for data and control communications between SCA and CCS, a WebSockets—Receive Callbacks from CCS, and a DNS Resolver—fast path for querying the CCS for directory (certificates) lookup and requesting for Mediation operations.

Figure 21:
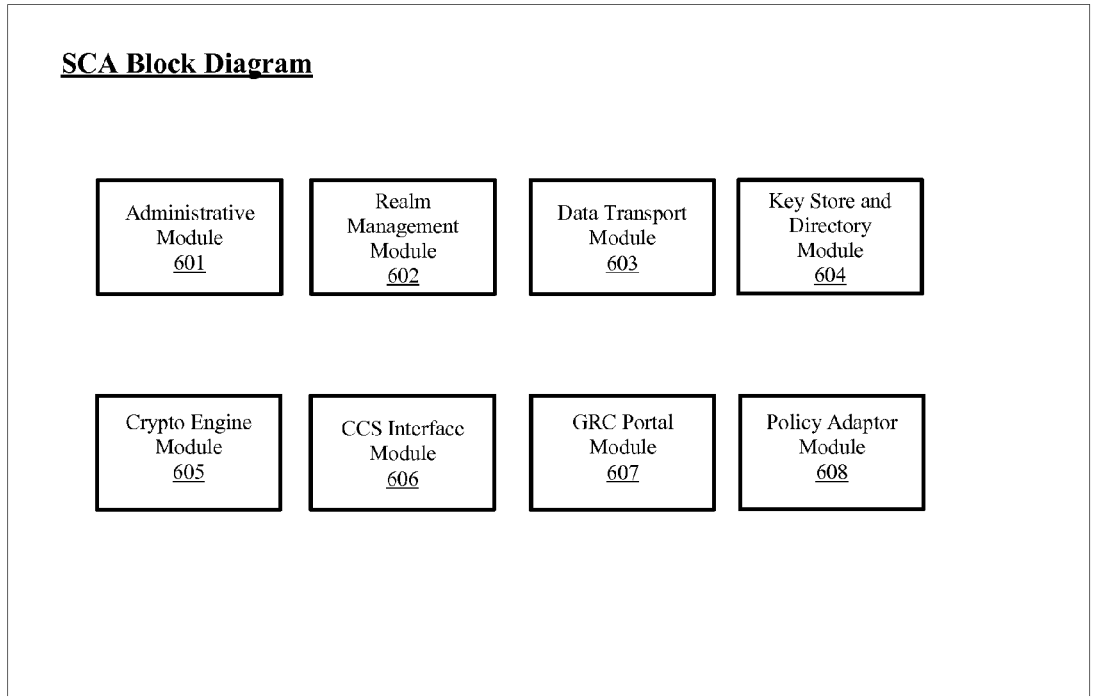
FIG. 21 shows a service connect agent according to an embodiment.

As shown, the owner 1210 as shown in FIGS. 12, 13, 14 and 15 is at least partially controlled by a server connect agent (SCA) 1242. For an embodiment, the SCA 1242 includes a software appliance that can be packaged as, but not limited by, a piece of executable program in a binary form, a virtual machine, or a dedicated server. For at least some embodiments, the software appliance runs within a curator's firewall. Depicted in FIG. 21, the embodiments of the SCA 1242 includes an Administrative Module 601, a Realm Management Module 602, a Data Transport Module 603, a Key Store and Directory Module 604, a Crypto Engine Module 605, a CCS Interface Module 606, a GRC Portal Module 607, an a Policy Adaptor Module 608.

For at least some embodiments, the Administrative Module 601 performs various configuration and administrative tasks to configure the local SCA, to manage users and groups within the SCA control, to interface with human users through a command line interface (CLI) or a UI interface (UI), to interface with other programs through an application programming interface (API), to update SCA software from the connected CCS, and to send event logs to CCS via CCS Interface Module 506.

For at least some embodiments, the Realm Management Module 602 is responsible for creating and managing a realm. The Realm Management Module 602 performs tasks to invite or permit parties that are partially controlled by CCAs to join the realm. It is also capable of revoking a realm membership. For an embodiment, a realm is one or more curators that are controlled by one SCA. Parties participating in the trustworthy workflow must be enrolled in at least one realm.

For at least some embodiments, the Data Transport Module 603 is responsible for data upload and download. The data can be uploaded from any data source within the one or more curators controlled by the SCA and to any data repository in the cloud through any data transfer protocol such as email, HTTP, FTP, etc. or physical data storage media such as floppy disc, CD ROM, DVD ROM, USB Drive, etc., and vice versa. One source of data can be content containers controlled by Microsoft© SharePoint software.

For at least some embodiments, the Key Store and Directory Module 604 stores the realm user's secrets (such as their private/secret keys,) that are encrypted and copies of various certificates that can be used for the SCA cache access and offline operations.

For at least some embodiments, the Crypto Engine Module 605 performs various encryption/decryption, signing, and key generation functions.

For at least some embodiments, the CCS Interface Module 606 performs secure communications with CCS. At least some embodiments of the CCS Interface Module 606 include a RESTful interface Adapter—CRUD calls for data and control communications between the SCA and CCS, a WebSockets—Receive Callbacks from CCS, and a DNS Resolver—fast path for querying the CCS for directory (certificates) lookup and requesting for Mediation operations.

For at least some embodiments, the GRC Portal Module 607 is responsible for configuring logs, alerts and reports for the realm, querying, and receiving from, CCS for logs, alerts and reports, searching and indexing logs, and caching logs locally, and presenting the log information.

For at least some embodiments, the Policy Adaptor Module 608 provides integration interfaces with the existing data and identity management infrastructures in the one or more curators controlled by the SCA. For at least some embodiments, the interfaces include support for protocols and services such as, an Active Directory (AD), an Active Directory Federation Services (ADFS), a Certificate Authority (CA), a Security Assertion Markup Language (SAML), an Online Certificate Status Protocol (OCSP), and/or Proxy Services.

As shown in FIGS. 12, 13, 14 and 15, the mediator 1230 at least partially controlled by a cloud connect service (CCS) 1234. For at least some embodiments, the CCS 1234 is a collection of software running as Software as a Service (SaaS) in the cloud, hosted by one or multiple Infrastructure as a Service (IaaS) providers. It is a high-scale, always-on, possibly geo-distributed policy enforcement point, which can facilitate complex, possibly cross-continental collaboration and commerce. The CCS 134 is termed "Trustworthy", meaning that it cannot access any data or policy in the clear or cheat because it is prevented from doing so by cryptography based technologies. Without such a capability it would be technologically complex to monitor and enforce CCS 1234 behavior, if at all that were to be possible.

Figure 22:
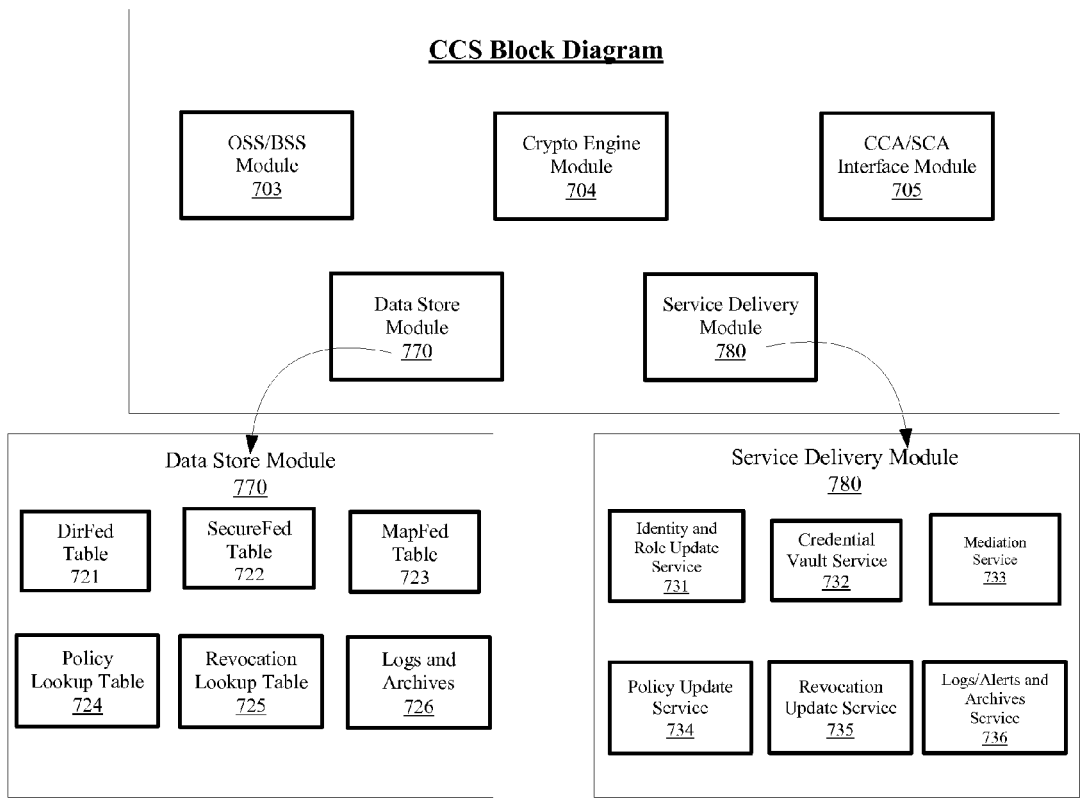
FIG. 22 shows a cloud connect service according to an embodiment.

As illustrated in FIG. 22, at least some embodiments of the CCS 1234 include an OSS/BSS Module 703, a Data Store Module 720, a Service Delivery Module 730, a Crypto Engine Module 704, and a CCS/SCA Interface Module 705.

For at least some embodiments, the OSS/BSS Module 703 performs operations including provisioning, metering, billing, syndication, federations, and other external service interfaces. An embodiment of the OSS/BSS Module 703 provides customer support and trouble shooting.

For at least some embodiments, the Data Store Module 720 at least partially includes one or more of a DirFed Table 721, SecureFed Table 722, a MapFed Table 723, a Policy Lookup Table 724, a Revocation Lookup Table 725, and a Logs and Archives 726. For an embodiment, the DirFed Table 721 is a directory for user and group identities, certificates, policies and other artifacts, which are typically represented by the corresponding entity's public keys. For at least some embodiments, the SecureFed Table 722 stores encrypted secrets. For an embodiment, the CCS, nor any custodian, is able to decrypt any entry in this table. For at least some embodiments, the MapFed Table 723 stores, among others, Group membership records, represented, at least partially, through signed Mediation Keys, and Realm roles including attestations and signatures from the realm SCAs. For an embodiment, the Policy Lookup Table 724 provides rapid lookup for multi-hop re-encryption key chains. For an embodiment, the Revocation Lookup Table 725 provides rapid lookup for revocation lists. For an embodiment, the Logs and Archives 726 keeps activities logs and events. It also archives for policies and activities, as well as data.

For at least some embodiments, for each sub-module 721-726, the Service Delivery Module 730 includes at least a corresponding services delivered to CCAs and SCAs. For an embodiment, services 731-736 of the Service Delivery Module 730 may interact with multiple sub modules 721-726. For an embodiment, an Identity and Role Update Service 731 receives identity and role update requests from SCAs and CCAs and updates the corresponding DirFed 721 entries. For an embodiment, a Credential Vault Service 732 uploads and downloads the encrypted data, encrypted keys and encrypted policies upon requests from CCAs and SCAs, and updates entries in SecureFed 722 and Logs and Archives 726. For an embodiment, a Mediation Service 733 receives Mediation Keys and Mediation operation requests from SCAs and CCAs, and performs the requested operations. It updates and reads entries in MapFed 723. It may also interact with Policy Lookup Table 724 and Revocation Lookup Table 725 to validate identities and authorizations. For an embodiment, a Policy Update Service 734 updates groups and group memberships in DirFed 721, upon requests from SCAs, among other tasks. For an embodiment, a Revocation Update Service 735 receives identity and role revocation requests from, primarily, SCAs and updates entries in MapFed 723 and Revocation Lookup Table 725. Among other sources, such requests may originate from the CA and OCSP interfaces in Policy Adaptor Module 608. For an embodiment, a Logs/Alerts and Archives Service 736 receives event logs from SCAs and CCAs and responds to SCAs (GRC Portal Module 607) requests The interaction methods between CCSs, SCAs and CCAs through above described modules and the combined system effects towards providing the trustworthy workflow across trust boundaries will become more apparent from the Operative Steps description as follows.

An embodiment includes a program storage device readable by a machine, tangibly embodying a non-transitory program of instructions executable by the machine to perform a method of an operator provisioning a trustworthy workspace to a subscriber. When executed, the method includes providing the subscriber with the trustworthy workspace, where in the trustworthy workspace comprises a virtualized content repository with trustworthy workflows for storing, sharing and processing a digital content across a plurality of repositories. The method further includes allowing the subscriber authority to sub-provision the trustworthy workspace to one or more authorized parties, wherein only the one or more authorized parties can view or modify at least a portion of the digital content.

Although specific embodiments have been described and illustrated, the embodiments are not to be limited to the specific forms or arrangements of parts so described and illustrated.

What is claimed:

1. A method for an operator provisioning a trustworthy workspace to a subscriber, comprising:
   providing, by one or more operator servers, the subscriber with the trustworthy workspace, where in the trustworthy workspace comprises a virtualized content repository with trustworthy workflows for storing, sharing and processing a digital content across a plurality of repositories;
   allowing, by the one or more operator servers, the subscriber authority to sub-provision the trustworthy workspace to one or more authorized parties, wherein only the one or more authorized parties can view or modify at least a portion of the digital content;
   facilitating the subscriber in vetting one or more other parties before allowing the one or more other parties to access the trustworthy workspace based on information of the one or more other parties, wherein the one or more other parties become authorized parties if vetted more than a threshold; wherein
   the information of the one or more other parties comprises at least identities of the one or more other parties; and wherein
   the information further includes at least one of reputations, associations of the one or more other parties.

2. The method of claim 1, wherein the trustworthy workspace comprises a directory.

3. The method of claim 2, wherein the directory enables a trustworthy mechanism for a user to discover other users.

4. The method of claim 2, wherein the trustworthy workspace further comprises a messaging service which leverages the directory to enable the subscriber to discover other subscribers or users who have not yet subscribed, and further comprising determining if the users who have not yet subscribed are authorized; and inviting the users who have not yet subscribed to join the trustworthy workspace and to become subscribers.

5. The method of claim 4 wherein subscribers have authorization to access and use the trustworthy workspace, wherein access and use includes an ability to send and receive messages.

6. The method of claim 5, further comprising allowing a recipient to associate a rating with a sender based on the content of message received.

7. The method of claim 6, further comprising aggregating of ratings, and enabling a policy on the sender to disallow or reduce an importance of messages being sent by the sender.

8. The method of claim 6, further comprising allowing the recipient to associate the rating with the sender based on credentials used by the sender to verify themselves to the workspace (is this worded correctly?).

9. The method of claim 8, the credential includes one or more of a secret passphrase or a SmartCard.

10. The method of claim 6, further comprising rating the sender based on a number of recipients and a frequency of messages sent by the sender.

11. The method of claim 6, further comprising allowing the recipient to associate a personal rating to the sender of an email to blacklist the sender.

12. The method of claim 1, wherein the one or more authorized parties include at least one of a publisher or a consumer of the digital content, or an administrator of the trustworthy workspace.

13. The method of claim 1, wherein providing the subscriber with the trustworthy workspace comprises the operator providing the subscriber with a primary workspace, wherein the subscriber has a delegated authority to create nested trustworthy workspaces, or groups, thereby allowing subsets of the one or more authorized parties to access digital content shared with each nested trustworthy workspace reside across the plurality of repositories.

14. The method of claim 1, wherein the authority to provision the trustworthy workspace includes access controls and authorization, which enables the authorized parties to provide at least an electronic identification of another party which triggers an automated trustworthy workflow to invite and enroll the other party, and to facilitate the other party joining the trustworthy workspace.

15. The method of claim 1, wherein the authority to provision the trustworthy workspace to the one or more authorized parties includes allowing the one or more authorized parties to at least one of create, enable access, delete, change, monitor, the electronic content in the trustworthy workspace.

16. A system for provisioning a trustworthy workspace to a subscriber, comprising:
one or more operator servers operative to:
provide the subscriber with the trustworthy workspace, where in the trustworthy workspace comprises a virtualized content repository with trustworthy workflows for storing, sharing and processing a digital content across a plurality of repositories;
allow the subscriber authority to sub-provision the trustworthy workspace to one or more authorized parties, wherein only the one or more authorized parties can view or modify at least a portion of the digital content;
facilitate the subscriber in vetting one or more other parties before allowing the one or more other parties to access the trustworthy workspace, based on information of the one or more other parties, wherein the one or more other parties become authorized parties if vetted more than a threshold; wherein
the information of the one or more other parties comprises at least identities of the one or more other parties; and wherein
the information further includes at least one of reputations, associations of the one or more other parties.

17. The system of claim 16, wherein the trustworthy workspace comprises a directory.

18. The system of claim 17, wherein the directory enables a trustworthy mechanism for a user to discover other users.

19. The system of claim 17, wherein the trustworthy workspace further comprises a messaging service which leverages the directory to enable the subscriber to discover other subscribers or users who have not yet subscribed, and further comprising determining if the users who have not yet subscribed are authorized; and inviting the users who have not yet subscribed to join the trustworthy workspace and to become subscribers.

20. The method of claim 19, further comprising allowing a recipient to associate a rating with a sender based on the content of message received.

\* \* \* \* \*